United States Patent
Milley et al.

(10) Patent No.: US 7,292,588 B2
(45) Date of Patent: Nov. 6, 2007

(54) WIRELESS NETWORK COMPUTING

(76) Inventors: Milton E. Milley, 10720 - 133 Street, Edmonton, Alberta (CA) T5M 1G6; Mark V. Fedorak, 66 Pembroke Crescent, St. Albert, Alberta (CA) T8N 4S7; Edmond Lou, 1307 - 117 Street, Edmonton, Alberta (CA) T6J 7G1; John-Michael B. Carolan, 14327 - 95A Avenue, Edmonton, AB (CA) T5N 0B6

( * ) Notice: Subject to any disclaimer, the term of this patent is extended or adjusted under 35 U.S.C. 154(b) by 1096 days.

(21) Appl. No.: 10/135,445

(22) Filed: May 1, 2002

(65) Prior Publication Data

US 2002/0186676 A1 Dec. 12, 2002

Related U.S. Application Data

(60) Provisional application No. 60/287,381, filed on May 1, 2001.

(51) Int. Cl.
*H04L 12/28* (2006.01)
*H04L 12/56* (2006.01)
*H04J 3/06* (2006.01)
*G09G 5/00* (2006.01)
*G06F 15/16* (2006.01)
*H04M 1/00* (2006.01)

(52) U.S. Cl. ................... 370/401; 370/503; 345/2.3; 709/201; 455/550.1

(58) Field of Classification Search ............... 370/503, 370/401; 345/2.3; 709/201; 455/550.1
See application file for complete search history.

(56) References Cited

U.S. PATENT DOCUMENTS

| 6,166,734 | A | 12/2000 | Nahi et al. |
|---|---|---|---|
| 6,181,931 | B1 | 1/2001 | Alldredge |
| 6,188,496 | B1 | 2/2001 | Krishna |
| 6,192,053 | B1 | 2/2001 | Angelico |
| 6,192,255 | B1 | 2/2001 | Lewis et al. |
| 6,195,340 | B1 | 2/2001 | Hatayama |
| 6,199,099 | B1 | 3/2001 | Gershman et al. |
| 6,201,484 | B1 | 3/2001 | Russell |
| 6,201,859 | B1 | 3/2001 | Memhard |
| 6,609,005 | B1 * | 8/2003 | Chern ..................... 455/457 |
| 6,662,224 | B1 * | 12/2003 | Angwin et al. ............ 709/224 |
| 6,993,358 | B2 * | 1/2006 | Shiotsu et al. .......... 455/552.1 |

FOREIGN PATENT DOCUMENTS

| WO | WO 9935831 A | 7/1999 |
|---|---|---|
| WO | WO 0072463 | 11/2000 |
| WO | WO 011903 A | 2/2001 |

* cited by examiner

*Primary Examiner*—Kevin C. Harper
(74) *Attorney, Agent, or Firm*—J. Jay Haugen; William J. Bundren

(57) ABSTRACT

A method, apparatus and article of manufacture are provided for obtaining and displaying Internet content using a remote secondary display and a primary handheld computing device. The primary device includes a cellular or satellite modem to connect to the Internet and wireless data transport system to communicate with the secondary device. The primary device retrieves network data from the Internet and transmits it to the secondary device for display. The secondary device includes a graphical user interface which may be controlled from the primary device.

26 Claims, 20 Drawing Sheets

WIRELESS NETWORK COMPUTING

PRIORITY CLAIM

This application claims the priority benefit of U.S. Provisional Application No. 60/287,381 filed on May 1, 2001 entitled "Method and Device to Extend Device Capabilities", the contents of which are incorporated herein in its entirety.

FIELD OF THE INVENTION

The present invention pertains to wireless computer networking and, in particular, to a method and apparatus permitting the use of remote display devices for displaying full Internet content using a handheld computing device.

BACKGROUND OF THE INVENTION

The introduction of the Internet Web browser and the development of wireless computer networks offered the promise of wireless e-commerce and Internet access. Conventionally, there are five principal methods for delivering wireless Internet solutions.

The first solution is to simply remove the need for cables in a computer network by using wireless transceivers to provide the communications link between computers. The second solution is to connect a computing device to a cellular phone and use the phone to connect to a wireless network. The third solution is to display reduced Internet content on a cellular phone-using Short Messaging Services (SMS) or Wireless Application Protocol (WAP). The fourth solution is to synchronize wireless data transfers between mobile devices (such as handheld or palm-sized computers) and stationary desktop computers. Lastly, cellular phone capabilities are being built into small handheld computing devices capable of displaying Internet content.

However, each of these solutions required a compromise that limits its ability to truly deliver mobile electronic commerce.

One method of dropping "wired" connections is to use a central transceiver capable of establishing and maintaining a radio frequency link between a computing device (including personal computers or PC's, personal digital assistants (PDA's), laptop, and handheld computers) and a central transceiver. The central tranceiver provides the remote device with wireless access to network resources using a wireless protocol such as 8002.11b, Bluetooth, or HomeRF which generally operate at unregulated frequencies such as 2.4 GHz. The computing device must have a wireless modem and transceiver to communicate with the wireless network and operate at the same frequency using the same wireless protocol. Software must be installed on both the central transceiver and the wireless device to manage transactional massages between these wireless davices.

A variation of this model is embodied in the latest format for portable computing devices, the tablet computer. A tablet computer resembles a notebook sized touch-sensitive screen that is equipped for Wi-Fi (a synonym for the IEEE's 802.11b protocol) or Bluetooth connectivity. A tablet computer would wirelessly connect to a wireless LAN (as described above) to provide network and Internet connectivity to the tablet device. The input mechanism is principally via the touch-sensitive screen which, due to it being larger in size than displays on PDA and handheld devices, makes the user interface easier to use than on hand-sized devices.

Another variation takes the form of TV set-top boxes which can also be configured with wireless adapter cards to allow users to wirelessly surf the World Wide Web using their TV and remote control. The significant difference here is the use of a television as the display mechanism. Otherwise, the use of the set-top box mimics the functionality of the wireless transceivers described earlier in providing the network connectivity.

While each of the above solutions is somewhat portable, in that cables are not required in order to deliver content to the display devices, they are all limited by the transmission range of the wireless LAN that provides the network connection. This means that the computing devices are dependent upon the wireless LAN and cannot offer the same levels of service without it. This is an "in-office" or "in-home" solution only. Beyond this freedom from cables, each of the devices using the wireless network functions as if it were wired directly to the network.

The second model in current use is to connect a PDA or handheld computing device with a cellular phone to offer a more mobile solution. In this embodiment, virtually any computing device that can be coupled with a cellular phone can offer Internet content provided that the cellular phone or computing device has a modem available to it and the necessary software to support content display (i.e. a browser) is available. Such a configuration can be wired, for example, the handheld device may be cabled to the phone via a data cable using a RS232 connection, but is otherwise completely portable. Alternatively, the handheld device may use a wireless connection, such as Bluetooth or another wireless protocol, to connect to the cellular phone. The wireless connection can also be established using infrared transceivers between the cellular phone and the PDA device. However, the use of infrared requires that both devices be aligned to have their infrared transceivers facing each other in order to communicate.

The difficulty with this approach is that the user must carry multiple devices around in order to have wireless access to Internet content. In the case of infrared communications, the user must ensure line-of-sight alignment of such devices for this to work. A further problem is that most Internet content to be displayed was not designed for the limited screen capabilities of PDAs or handheld devices and is therefore not easily viewed in this configuration. Such devices also have limited input capabilities due to their small size. The sum of these limitations may be inconvenient for mobile users.

In response to the limitations of handheld computing devices and mobile phones, and in an effort to provide Internet content to users regardless of location, a handheld markup language was defined that is known today as Wireless Markup Language (WML) and is supported by a specialized protocol called Wireless Application Protocol (WAP). WAP is therefore not a device, but a protocol. In fact, it was developed with the specific intent of offering Internet content over cellular phones. Indeed, the development of WAP resolved many of the problems associated with wireless communications such as signal latency, connection dropping, and device typing (to address each device's limits with respect to screen size, power management, and input characteristics). However, the basic assumptions of WAP are that only text and rudimentary bitmap images are to be supported by WAP-enabled devices. The limitations of WAP may be frustrating for users used to viewing Internet content on their desktop.

A competing standard to WAP has emerged in Japan in the form of NTT DoCoMo's i-mode browser, which displays standard Hypertext Markup Language (HTML) Internet content. i-Mode is supported by NTT's network, which does most of the work in preparing Internet content for display on the limited screen of the user's phone. Howwever, i-mode is also constrained by the mobile device's screen size.

Another form of Internet content available to mobile phones is represented by the short Messaging Service (SMS). This variant allows short text messages, 250 characters or less, to be sent to mobile phones by the user entering a text message on their phone, dialing a phone number of the intended recipient, and having the massage forwarded to a network server to route the message to the recipient. The server software interprets the call as SMS and stores the message on the server. The server then calls the recipient and posts the message on their phone's display screen. If the recipient is presently unavailable, the message will remain on the server and the recipient will be notified of the message when their phone is turned on or their line is made available for calls.

Because of the limited input capabilities of most handheld devices, PDA manufacturers have long recognized the need to exchange data from handheld devices to other devices more capable of viewing and manipulating such data (such as PCs and laptop computers). These manufacturers have therefore developed data synchronizing software and hardware to support the transfer of information from handheld devices to computers (and other handhelds)—and vice versa. In fact, a consortium established in 1999 to standardize such data synchronization has produced a new markup language called SyncML. This standard is intended to alleviate the incompatibilities between synchronization solutions offered by independent vendors.

Regardless of the method of synchronization used, the principle remains the same. Data must be stored as a file or record, on either of the handheld device or PC, and software needs to check the state of the data to determine if changes or additions to the file or record have occurred since the last synchronization. If the data is different between the two devices, then the data will be copied to the device (handheld or PC) that has the oldest copy or is missing a copy. Deleted files can similarly be handled by removing the file or record from both devices based on a deletion flag associated with the data.

Such synchronizations are necessary to avoid loss of data and to permit the accessibility to such data by the portable device. However, manipulation of such data via the handheld device can be onerous due to the small screen size and limited input characteristics of such devices. Synchronization is a reflection of the weakness of handheld computing devices to be fully functional in their own right. Users are still responsible for initiating and configuring the characteristics of such synchronization. So mistakes will be made and data, potentially, lost. It also relegates handheld devices to be more of a "viewer" than an actual computing device. Display capability, because the viewing image is usually small and lacking in colour or image depth (low pixel count), is not the handheld's greatest strength.

There has been a significant move towards converging telephony with handheld computers. This solution provides for the software utilities embedded in most PDAs, such as calenders, phone directories, note editors, and game features to be combined with cellular phone capabilities. Both cellular phone and PDA manufacturers have approached the solution by leveraging the strengths of their prospective devices. Phone manufacturers have combined PDA capabilities with their mobile phone/pagers to produce a number of "smart" phones. Handheld device manufacturers have incorporated cellular phone accessories to their devices to accomplish the same thing. At the present time, these offerings are mostly add-on components to the PDA. However, this will likely change with new models having built-in wireless connectivity. The same is true for two-way pager manufacturers who have taken a similar approach by offering more computer functionality on their devices.

Regardless of the approach taken, combining mobile phones with computing devices still leaves users with a dilemma. They now have ultra-portability, but are still constrained by the small viewspace and input controls of the portable device. To fully support wireless Internet capabilities, these devices must address these perceived shortcomings.

Therefore, there is a need in the art for methods and apparatuses that permit use of alternate display devices to display content not suited for the limited displays on handheld devices.

SUMMARY OF THE INVENTION

The present invention is directed to methods and apparatuses for wireless network computing where the collaboration of two or more devices provides functionality not possible from a single device. The methods disclosed herein may be implemented in cellular phones, PDAs, handheld computers and other mobile devices and allow users to wirelessly control other devices capable of displaying full Internet content. In particular, the invention is directed to wireless Internet computing using remote display devices and handheld computers.

Accordingly, in one aspect of the invention the invention comprises a method of network computing using a primary device and a secondary device, wherein said primary device indudes a central processing unit, a memory, a user input device wirless network connection means and wireless secondary device connection means, and wherein the secondary device includes an operating system, a graphical user interface that comprises display means and wireless primary device connection means, the method comprising the steps of:

(a) establishing a wireless two-way communication connection between the primary device and the secondary device;

(b) establishing a wireless network connection between the primary device and a computer network;

(c) generating command data for synchronizing the secondary device with the primary device and controlling the secondary device from the primary device and transmitting command data to the secondary device;

(d) receiving user input commands at the primary device and transmitting user input commands as interface data from the primary device to the secondary device;

(e) receiving data and data requests generated by the secondary device at the primary device and transmitting the data and data requests to the computer network from the primary device;

(f) receiving computer network data and data requests from the computer network at the primary device and transmitting the computer network data and data requests to the secondary device from the primary device; and (g) wirelessly controlling the secondary device with the primary device to display the computer network data using the display means of the secondary device.

In another aspect, the invention may comprise a primary computing device including a central processing unit and a memory comprising:
- (a) wireless computer network connection means;
- (b) means for wirelessly connecting with a secondary device which includes an operating system and a graphical user interface comprising display means:
- (c) means for accepting user input commands and generating interface data;
- (d) receiving user input commands at the primary device and transmitting user input commands as interface data from the primary device to the secondary device;
- (e) means for receiving computer network data and data requests from the computer network;
- (f) means for generating command data for synchronizing the secondary device with the handheld device, for controlling the secondary device from the handheld device and for commanding the secondary device to display computer network data using said display means; and
- (g) means for transmitting command data, interface data and computer network data and data requests to the secondary device whereby said handheld device is capable of wirelessly controlling the secondary device to display the computer network data using said display means.

In another aspect, the invention may comprise a method for controlling a secondary device from a primary device in network computing, said method being embodied on a computer-readable medium such that, when implemented on the primary device including wireless computer network connection means and means for wirelessly connecting with the secondary device which includes an operating system (and/or virtual machine, and/or interpreter), a graphical user interface and wireless primary device connection means, said method permits control of the secondary device by the primary device, the computer-readable medium comprising:
- (a) a code segment which generates command data for synchronizing the secondary device with the primary device and controlling the secondary device from the primary device;
- (b) a code segment which processes user input commands to the primary device and generates interface data;
- (c) a code segment which receives data and data requests from the secondary device and transmits them to the computer network;
- (d) a code segment which receives and processes network data from the computer network; and
- (e) a code segment which causes transmission of command data, interface data and network data and data requests to the secondary device whereby the primary device is capable of wirelessly controlling the secondary device to display the computer network data on the graphical user interface.

In yet another aspect, the invention may comprise a computing device including a central processing unit and a memory comprising:
- (a) wireless computer network connection means;
- (b) means for wirelessly connecting with a secondary device which includes an operating system and a graphical user interface;
- (c) logic which generates command data for synchronizing the secondary device with the computing device and controlling the secondary device from the computing device;
- (d) logic which processes command data;
- (e) logic which processes user input commands and generates interface data;
- (f) logic which receives network data and data requests from the secondary device and transmits them to the computer network;
- (g) logic which receives network data and data requests from the computer network; and
- (h) logic which causes transmission of command data, interface data and network data and data requests to a secondary device whereby the computing device is capable at wirelessly controlling the secondary device to display the computer network data on the graphical user interface.

BRIEF DESCRIPTION OF THE DRAWINGS

The invention will now be described by way of exemplary embodiments with reference to the accompanying simplified, diagrammatic drawings. In the drawings.

DETAILED DESCRIPTION OF THE INVENTION

The present invention provides for methods and apparatuses for wireless network computing. When describing the present invention, the following terms have the following meanings, unless indicated otherwise. All terms not defined herein have their common art-recognized meanings.

The term "network data" refers to data and data requests which are sent either by the network or to the network.

The term "interface data" refers to data which results from the transformation of interface commands input by the user on the primary device, examples of which are pointer movement and key inputs.

The term "command data" refers to data which is sent by either the primary or the secondary to control the session and the actions taken by each device.

The term "Bluetooth™" refers to a wireless protocol standard advanced by the Bluetooth Special Interest Group for a small-form factor, low-cost radio solution that provides links between mobile computers, mobile phones, other portable handheld devices, and connectivity to the Internet.

In one embodiment, a primary mobile device such as a handheld computer with wireless connectivity is used to wirelessly display Internet content on a secondary device, which includes a display. The primary device thus retains its mobile characteristics, primarily its ability to receive content wirelessly, but can utilize the functionality and connectivity of proximate secondary devices. This method does not diminish the independence of the primary device. It will work the same as it normally would when isolated from other devices. However, it can extend its own capabilities in the presence of other devices that support the methods of the present invention.

Figure 1A:
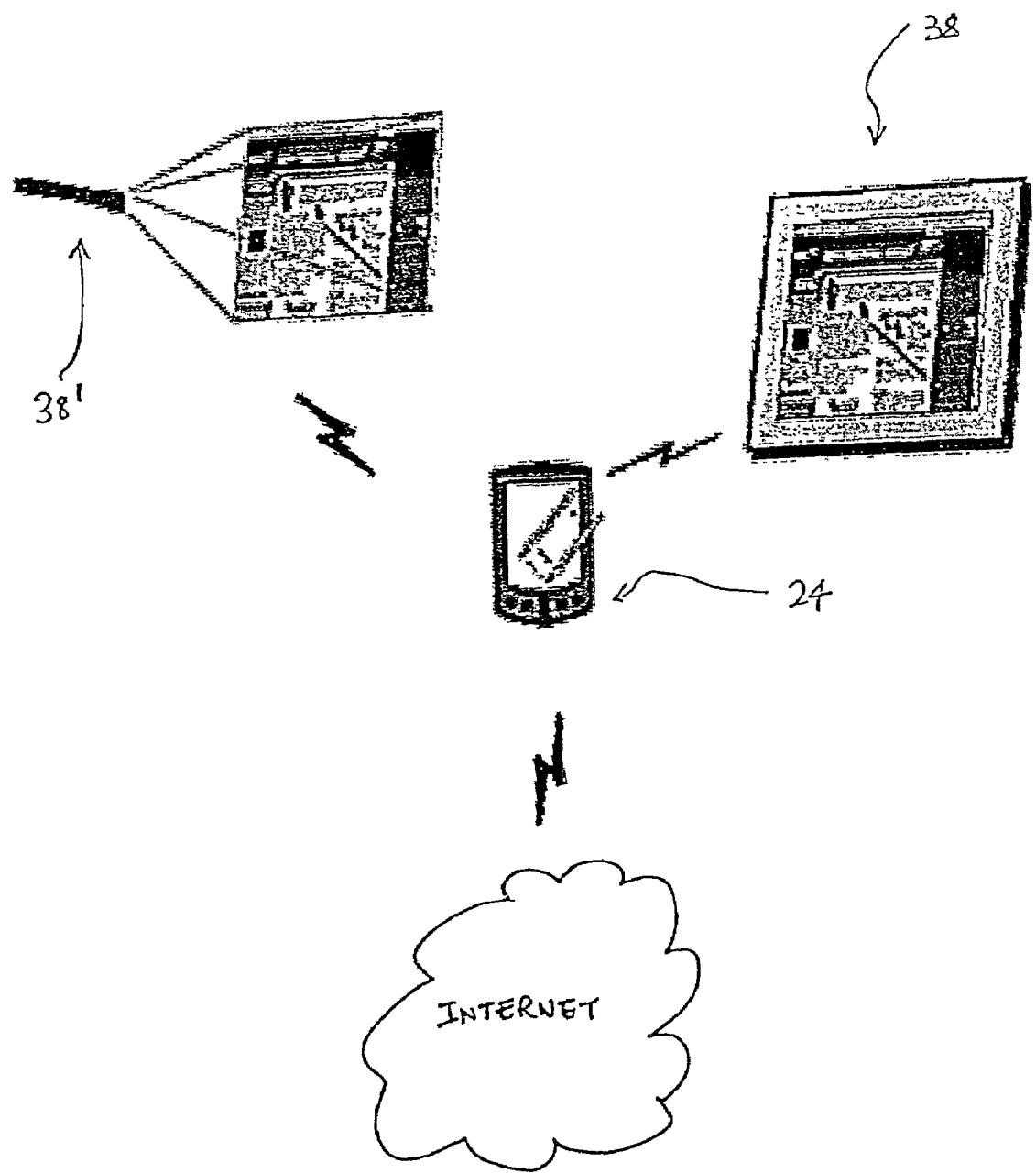
FIG. 1A is a schematic diagram of one embodiment of the invention.

One specific embodiment is illustrated in FIG. 1A. In this embodiment, a primary device (24), such as a hybrid cellular phone/PDA, connects with a secondary display device (38, 38') which is equipped with its own operating system, CPU, video capabilities, Web browser software and a graphical user interface. The secondary device (38, 38') is controlled by the primary device (24) to display full Internet content. Lacking its own Internet connection, the secondary device receives its content via the primary device (24) using the methods described herein. The secondary device may be, without limitation, a general purpose computer and monitor, either desktop or laptop, a printer, or a smart monitor or television. In one embodiment, the secondary device may comprise a flashlight-sized projector (38') which would only need to project a few feet in order to produce the images corresponding to a full-sized computer monitor or TV screen. But the portability of the cellular phone and projector would free the user to go anywhere and still receive and view the same Internet content.

The methods of the present invention differs from prior art models by offering complete flexibility in establishing the network even in the absence of a home or office network. Thus, it will work both inside and outside of the home or the office equally and will offer the same level of access in both instances. It does so by establishing the network "as needed". If an existing network exists for the secondary device, the method allows for its use by the secondary under the control of the primary device. In the absence of the network, the method provides one wirelessly via the primary handheld device.

The method defined by this invention differs from WAP and SMS in its ability to provide full Internet access, especially World Wide Web content, not just text and rudimentary bitmap images, to users in remote areas. Content does not have to be "clipped" from HTML for delivery; the original content can be displayed so long as the primary handheld device is in proximity of a secondary display device capable of displaying the content.

The method defined by the present invention provides a peer-to-peer mechanism for exchanging data. Inputs from a primary device are passed in real-time to the secondary device for processing. In this way, the primary device leverages the capabilities of the secondary device. In one embodiment, the secondary device includes a display, an operating system, a browser integrated as a graphical user interface, along with the means for wirelessly connecting to the primary device. In one embodiment, the secondary device may be a "smart" monitor, which includes an operating system, a browser and wireless connectivity, but may not necessarily include any user input devices or other network connectivity.

The primary device embodies both the user input mechanism and the network connection. Though synchronization may still be supported, the system has the ability to pass inputs concurrently with data routed via the wireless network connection contained by the handheld.

The present invention enhances the utility of the small footprint and mobility that characterizes handheld/PDA devices. It does so by recognizing that wireless allows for the viewing area to be literally "out-of-the-box". While collaboratively displaying content using proximal secondary displays, the handheld can retain its portability features. As wireless communication speeds increase under 2.5 and $3^{rd}$ generation telephony, such as IMT2000 (International Mobile Telecomms-2000) and UMTS (Universal Mobile Telephone Service), the ability to deliver Internet content at speeds comparable to a broadband connection may become a reality.

Therefore, the present invention relates to methods and devices for a system to allow at least one primary device to control at least one secondary device while providing a simultaneous connection to a network for the secondary device. This will allow both the primary devices and the secondary devices to access content and functionality that may or may not be available using the capabilities of each independently. But, moreover, it allows for this network connection to move with the primary device so that the user is never without a network connection, so long as cellular or satellite telephony services are available.

Before a session can be initiated, both devices must be configured to accept connections using the method. Both the primary device, in single or multiple, and the secondary device, in single or multiple, must have the software and/or hardware that supports the method. On either device, this software may be embodied as an application running inside an operating system, the operating system itself, an embedded application, or as firmware encoded on a processor. The hardware could be any logic device, synchronous or asynchronous, that is capable of running the software. In one embodiment, an integrated circuit could be designed to incorporate all of the hardware and software into a single chip. The primary device may be any device, including, but not restricted to, personal digital assistants (PDAs), pagers, handheld computers, mobile phones, watches, TV remote controls, or any other portable device capable of establishing a wired and/or wireless connection and capable of cellular or satellite telephony.

All primary and secondary devices should preferably contain a unique device ID number, which may be a plaintext string containing a human recognizable ID for the device, and may further include one or more encryption keys, information about its own capabilities, and what capabilities it is allowed to share with other devices. A database containing information on previously connected devices, and the capabilities extended to such other devices by the current device, may optionally be stored in memory on the device, depending on the security required in the current environment.

If primary and secondary devices have been configured to permit remote control of, or by, another device, then one or more primary devices may initiate a connection with a secondary device. The transmission medium may be any transport mechanism using any protocol that supports networking, such as TCP/IP.

In one embodiment of the method, an application level linkage is established on top of that established by the wireless network itself. In one embodiment, the discovery and linkage between devices is handled by the wireless protocols in place. A device serving as the primary may then poll each device so linked to determine if it supports the remote control capabilities described by this method. The broadcast message will also request the status of the other device's configuration to determine if a connection to the other device can be established. Each device that supports the method and is so configured will return its identification information to the primary. The primary then prepares a list of all such devices and displays the list to the user in a format suited to the primary device's display. After the primary and secondary devices have successfully exchanged the required connection information, a session is enabled—but is not yet active.

The user may then select one or more devices with which to activate a control session using the input methods supported by the primary device. This may be a keyboard, pointing device, touch pad, or alternate input device (including voice activation) either contained within the primary device or controlled externally via a cable or docking mechanism. The user may then activate a session by instructing the primary device via its user interface to establish a control link to one or more of the selected secondary devices. In an alternative embodiment, rules-based automated activations may take place when such devices come within proximity, or are connected to each other where discovery and linkage takes place via the application layer, data link layer and transport layer.

During the initialization of an active session between two devices, the ID information, device description, and network capabilities of each are exchanged. Once the exchange is complete, the session is active and the primary can pass control information (inputs) to the secondary to control the functionality of the secondary. The connection between the primary and secondary may or may not be encrypted depending on whether or not the primary and secondary are configured to do so. This includes the encryption of individual keystrokes if so configured. This is to prevent passwords and and other sensitive information from being detected and recorded by other devices not authorized in this exchange of information.

Secondary devices may be configured to restrict the types of resources the primary is allowed to use. Thus, the secondary may maintain a database of different primary ID numbers and the list of resources each primary is permitted to utilize. For example, a secondary may be setup to only allow a specific primary (defined by its device ID) to use its network connection. For an environment where a multiple of primary and/or secondary devices are to be used, this database will also consist of precedent levels for each primary device. This allows some primary devices to have a greater level of control over the session.

A primary not authorized to use the secondary device's existing network, if present, will be informed during the setup process that the secondary has no network connection available and such connections will be denied to the primary if they do exist. If the secondary is configured to accept an alternate network connection, then the primary will supply its own network connection for the secondary device by having network requests routed through the primary's own communication network.

A primary device may also be configured such that only its own resources are to be utilized in establishing a network connection. An example of this scenario is when the secondary device has no network connection and all content must be accessed through the primary device. Another example of this would be when a user has to connect to a private network through a corporate network gateway in order to access confidential information. If the primary used the secondary's network connection (which would likely be faster and more reliable) the primary would be barred from reaching the desired content. Establishing its own network connection allows the primary to reach the desired content.

Should there be a conflict in settings (i.e. both the primary and secondary are configured to use only their own network connections), the user will be notified prior to session activation.

When the primary activates a session with a secondary, a network connection may not immediately be initiated. In one embodiment, the network connection will be initiated only when an application that requires the connection is started; for example, if the browser on the secondary device is opened. This allows for additional security and lower network usage costs due to a demand-based network usage structure rather than an always-on structure. However, alternative embodiments utilizing an always-on structure are also within the scope of the present invention.

To initiate a network connection, the user must start an application, such as a Web browser, on the secondary device, which will then request a network connection. The secondary will then inspect its own settings, and the session settings supplied by the primary, and will decide which network connection is to be used. If the secondary has no connection whatsoever, then the connection will be initiated through the primary. If the secondary has its own connection, and is permitted to share the connection with the primary, then the connection will be initiated through the secondary. If the primary and secondary devices have no connections available, the user will be given an error message. In one embodiment, it may be possible for the secondary to use both its own connection and the primary's connection simultaneously, this might be needed if one application needs access to the primary's network and another application needs access to the local network.

A session can be terminated directly by the user using the primary's interface to end the session. Otherwise, the session may be terminated if the connection is broken by corruption of the transmission medium, the physical removal of the device from the network, one or both devices involved in the session are powered off; or the secondary device's settings are changed to disable communication with the primary device.

With reference to FIG. 1A, in one embodiment, the basic system (20) comprises a primary device (24) and a secondary device (38) where the primary device permits connection to the Internet or another computer network and transmits the content received from the Internet or other computer network to the secondary device. The secondary device permits remote visualization of the content and the graphical user interface which would normally be seen and interacted with in a browser window.

Figure 1B:
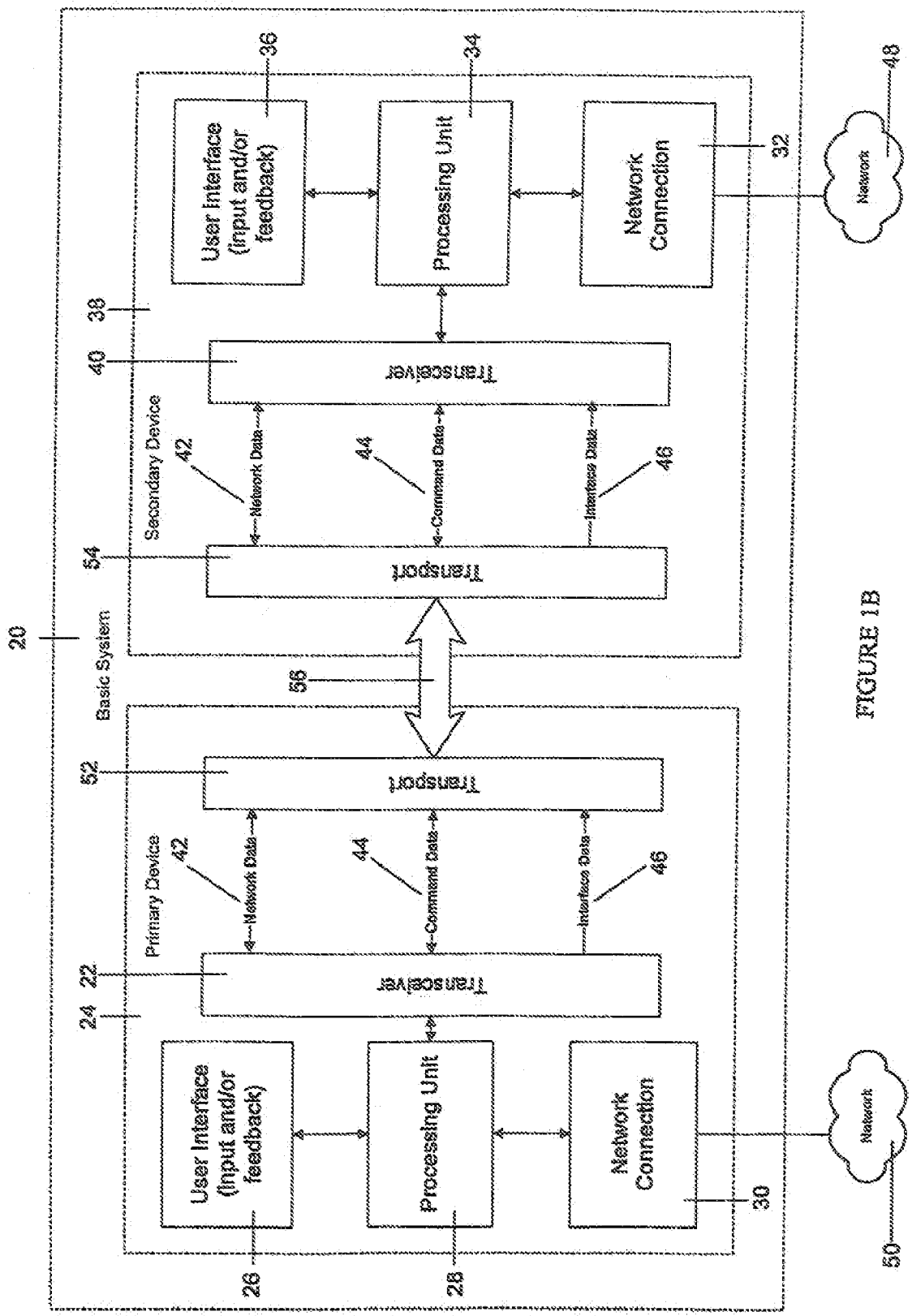
FIG. 1B is a schematic diagram of an alternative embodiment of the invention.
Figure 1C:
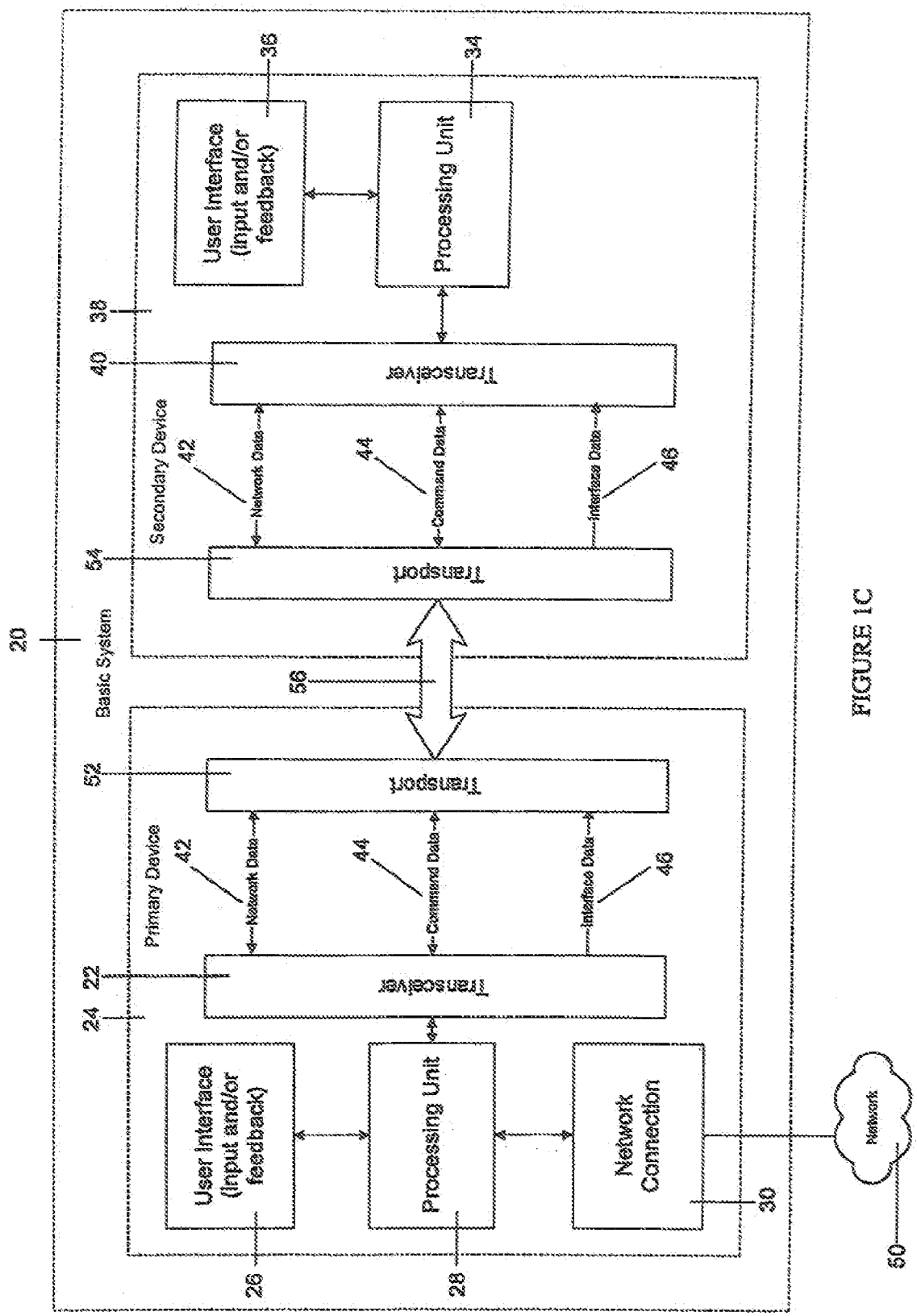
FIG. 1C is a schematic diagram of an alternative embodiment of the invention.

As shown schematically in FIGS. 1B and 1C, in general terms, the primary device (24) is a handheld computing device which includes a transceiver (22), a processing unit (28), a user interface for input and output (26), and a network connection (30). The primary transceiver (22) outputs and receives data streams to and from the transport system (52), and the transport system will then transmit the data stream to the secondary transceiver (54) through the secondary transport system. In one embodiment, the transport system (52) implements a wireless protocol such as Bluetooth™.

The primary device user interface (26) may contain both an input device, which can be, but is not limited to, a pointer control, keyboard, touch pad, voice control or some other alternate input device, and a feedback device, which can be, but is not limited to a display medium such as a CRT or LCD screen. In one embodiment, the input device and feedback device are incorporated into a single touch-sensitive display screen, as may be exemplified by the Palm™ family of PDAs.

The processing and control unit (28) is used to control and route data through the primary device (24). It may be a microprocessor, microcontroller, digital signal processor, or an integrated circuit; however, it can be any type of synchronous or asynchronous logic device capable of performing the control and data routing functionality required to implement the invention. The primary control unit (28) should contain a memory (which may include a hard drive, RAM, ROM, flash memory or a combination of these), software (which may include an operating system and a Web browser), and hardware required to interconnect all of the components of the device (24).

The network connection (30) is used to provide external content to both the primary and, from the primary, to the secondary. It will normally be a wireless connection through a cellular or satellite network using a cellular or satellite modem, but can also be through any other network carrying any protocol whatsoever.

The secondary device (38) includes a transceiver (40), processing unit (34), a user interface (36) which will primarily be a display screen to permit a graphical user interface. The secondary device may include a network connection (32) although that is not necessary. The secondary transceiver (40) will handle three data streams (42, 44, 46) which will then go to the transport system (54), the transport system will then propagate a wireless signal to the primary's transport system (52).

The user interface (36) may contain both an input device, which can be, but is not limited to, a pointer control, keyboard, touch pad, voice control, or some other alternate input device. It is not necessary that the secondary device have any user input capability as all user input may be provided through the primary device. The user interface will, in most cases, be a feedback device such as a display medium such as a CRT or LCD screen.

The secondary processing and control unit (34) is used to control and route data through the secondary device (38). It may be a microprocessor, microcontroller, digital signal processor, or an integrated circuit, however it can be any type of synchronous or asynchronous logic device capable of performing the control and data routing functionality required to implement the invention. The secondary control unit (34) should contain a memory (which may include a hard drive, RAM, ROM, flash memory or a combination of these), software (which may include an operating system and a Web browser), and hardware (graphics drivers, Ethernet chips) required to interconnect all of the components of the secondary device.

In a basic embodiment, a single primary device works in conjunction with a single secondary device. However, more complicated systems within the scope of this invention would allow multiple primaries to connect to a single secondary, a single primary to connect to multiple secondary devices, or multiple primary devices to connect to multiple secondary devices.

The transport system (52, 54) works closely with the transceivers (22, 40) and the processing units (28, 34) to determine which information needs to be sent to setup the data streams (42, 44, 46) between the primary (24) and secondary (38). In fact the transport systems (52, 54) and transceivers (22, 40) may be contained entirely within the processing unit (28, 34), or may be a combination of hardware and software both inside and outside of the processing unit (28, 34). An example would be Bluetooth (TCP/IP) where most of the multiplexing and data preparation is done inside of the processing unit using a Bluetooth (TCP/IP) stack, and only the modulation and connection functionality is handled by external Bluetooth (Ethernet, Token ring, 802.11b) hardware.

In one embodiment shown in FIG. 1B, both the primary and secondary devices have computer network connections. In this embodiment, the desired content may be delivered through the primary device or the secondary device depending on which has access, or better access, to the desired content.

In one embodiment shown in FIG. 1C, the secondary device does not have a computer network connection. In this embodiment, all external content must be delivered through the primary device's network connection. This variation may also apply where the secondary device has a network connection but does not have permission to access the desired content. If the secondary device has the desired content stored in memory, which is accessible by the secondary device, the primary device may control the secondary device to display such stored content. In this capacity, the primary serves only as a remote controller.

Both the primary device (24) and secondary device (38) depicted in FIGS. 1B or 1C may have other components or devices attached to them.

There are three types of information that are transmitted between the transceivers (22, 40): network data (42, 304), command data (44, 306), and interface data (46, 308). The transport systems (52, 54) on both the primary and secondary allow for the data streams to be prepared for optimum transmission through a medium (56). Although other data flow configurations are possible, the five main scenarios are outlined in FIGS. 9A through 9E. Some of the data flow scenarios may have transport controllers (312) and multiplexers and demultiplexers (310, 316) that must be described before the scenarios are presented.

For all of the above data flow scenarios shown in FIGS. 9A to 9E the flow is bi-directional. Thus the three transmitted data streams (304, 306, 308) from the first transceiver (300) sent to the second transceiver (302) undergo the same process as if the three data streams were transmitted by the second transceiver (302) to the first transceiver (300). On the system block diagram shown in FIG. 1B, the transceivers (22,40) are the same transceivers as shown in FIGS. 9A-9E (300, 302); thus the transport systems (52, 54) are the combinations of multiplexers/demultiplexers (310, 316) and transport controllers (312), and the medium (56) carries all of the signals (314, 318, 320, 322, 324, 326, 328, 330, 332, 334).

A transport controller (312) can be several layers of software, an implementation in hardware/firmware, or a combination of the two. The transport controller (312) packages, assembles, modulates and transmits data. The controller will also receive, demodulate, unpack and disassemble received data to recover information transmitted by the other device. The packaging and assembly process will involve any or all of formatting, compressing, digital signing, encrypting, and the addition of error correction. The unpacking and disassembly process will retrieve the original transmitted information by error correcting, verifying, decrypting, uncompressing, and restoring the received data as necessary. The transport controller (312) also filters out received data, which is not part of the method or part of the communication between devices. In addition to the above, the transport controller (312) would also control the connection between two or more devices, including link loss, and other characteristics. It is also possible that the transport controller (312) will not modify the data at all.

A multiplexer/demultiplexer (310, 316) could be any device, implemented in software, hardware, or a combination of software and hardware that combines (multiplexes) multiple input streams of information to produce fewer output streams of information. Multiplexed streams can be separated (demultiplexed) to obtain the original streams of information. An example of software multiplexers (310, 316) is the GSM TS 07.10 standard, of which a subset is used in the Bluetooth protocol.

Figure 2:
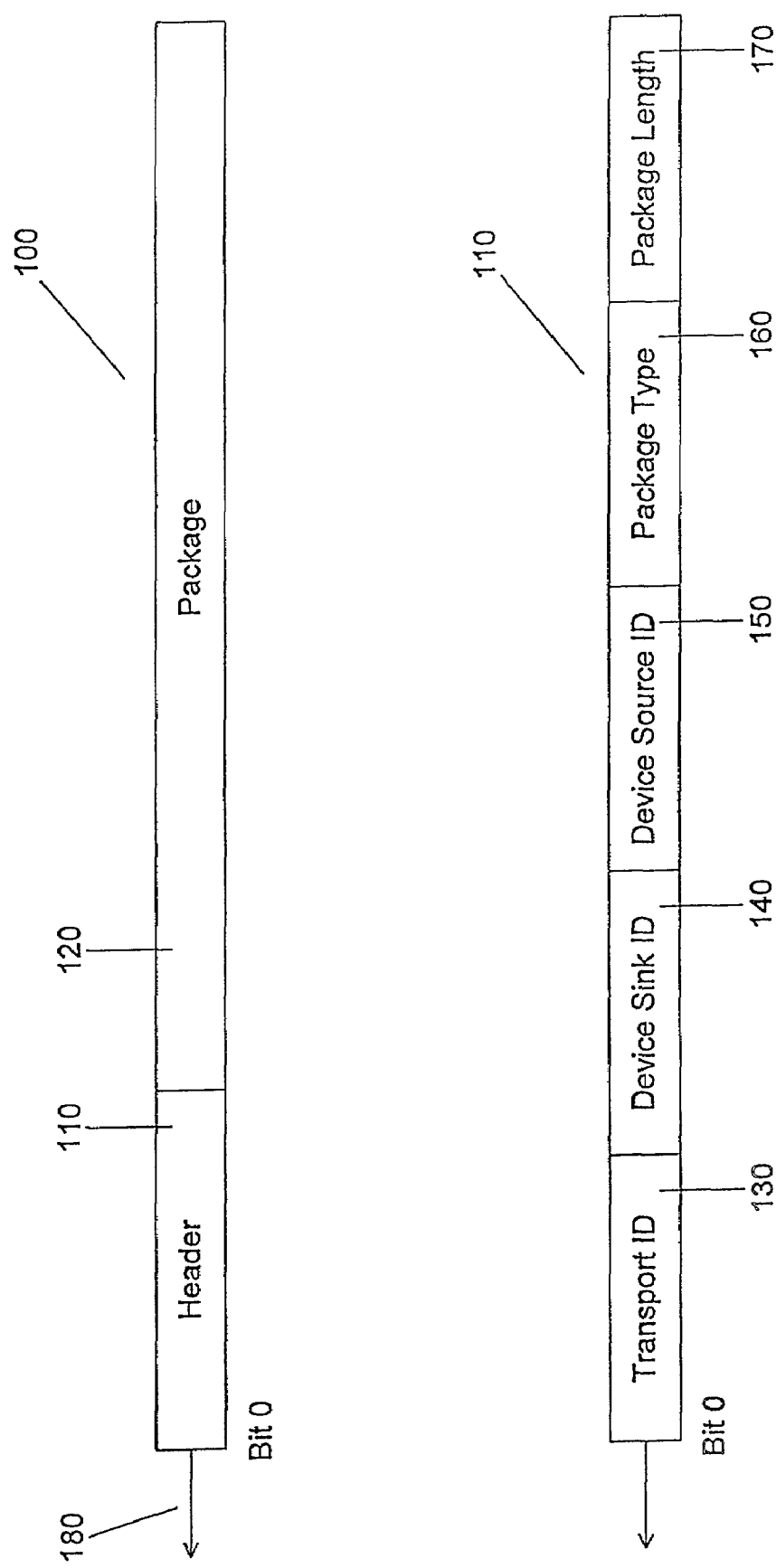
FIG. 2 is a depiction of a possible packet structure that may be used by the method to communicate between embodied devices.

Communication between devices (24, 38) using multiplexed data streams (full or partial) may use a software multiplexer based on an industry standard packet structure, for example, GSM TS 07.10 or the Bluetooth standard RFCOMM. The following packet structure (100) is presented as an implementation specific multiplexer that could be used to supplement or replace industry standard multiplexers. This packet structure (100) is shown in FIG. 2. The packet (100) consists of two parts: a header (110) and a package (120).

The header (110) consists of a transport ID (130), Encryption Status (175), device sink ID (140), device source ID (150), package type (160), and package length (170). The transport ID (130) contains the transportation information required by the protocol over which the packet (100) is being transferred. For example, this can be a Bluetooth ID number. The Encryption Status (175) indicates what encryption level is utilized. The device sink ID (140) is the address of the destination device to which this packet (100) is to be delivered; it is of fixed size. The device source ID (150) is the address of the device from which the packet (100) originated and is also of fixed size. The package type (160) indicates whether the information located in the package (120) is a command (44), interface information (46), or network data (42) and is only 1 byte in size. The package length (170) indicates the number of bytes in the package (120). This is 2 bytes in size and is a number between 1 and 65536.

The package (120) contains the information to be transferred. In one embodiment, three different types of packets (100) are defined and used. The first is the command packet (44), which will contain commands to synchronize and configure the two devices; this packet is bi-directional. The second is the interface packet (46), which contains the cursor, pointer keyboard commands, and voice data; it is unidirectional. The last packet is the network data packet (42) and it is bi-directional.

The entire packet (100) following the transport ID (130), or just the package (120), can be encrypted prior to transport, then transported, and decrypted by the appropriate receiver. The encryption level packet (100), package (120), or none is stored in the Encryption Status (175). This can add an extra layer of security to the entire process especially in a wireless environment where several receivers may receive the same data. It can also prevent against a modified device impersonating another device that is listed as trusted (one in which communication is normally allowed) in the database. If encryption is utilized the encryption algorithm and hardware must be able to keep time with the incoming data rate otherwise packet loss can be expected.

The packet (100) is transferred with bit 0 of the header (180) first, followed by each bit in sequence. The packet (100) can be processed bit by bit as it is received, or the entire packet (100) can be read in and then processed; or the header (110) can be processed bit by bit and the package (120) in its entirety. The transport ID (130) may be stripped off and not transferred depending on the requirements of the transport protocol, a software or firmware layer below the method will examine the packets (100) and determine where the data should be sent. It is this layer that will decide whether or not the transport ID (130) needs to be stripped off. The size of the transport ID (130) will change for the transport protocol used. The processing of packets is accomplished through the processing units (28, 34).

The processing unit (28, 34) of the receiver of the packet (100) will first look at the encryption status (175) to check and see if any decryption will be required. Then it will look at the device sink ID (140) to see if it matches the internal ID that was programmed into it. If the two do not match the rest of the packet (100) is discarded. If the ID does match then the device will look at the device source ID (150) to see if a session with the transmitter has already been started. If the session is already active then processing will continue. If the receiver already has an active session with another device, and is not allowed to have more than one active session, then the rest of the packet (100) is discarded. If the receiver does not have an active session, then processing will continue under the context that a session is being started. If both the sink ID (140) and source ID (150) are the same, then processing will cease and the remainder of the packet (100) will be discarded.

Once a packet (100) is verified to be for the receiver from an appropriate transmitter, processing of the header (110) will continue. The device now looks at the package type (160) and determines the type. If it is a command packet (44), it might contain connection or disconnect commands, time sync, description of network capabilities, etc. If it is an interface packet (46), it might contain cursor or interface data, and if it is a network packet (42), it will contain network data. The device will then look at the package length (170) and get the package (120).

Now that both the package type (160) and the package (120) have been recovered, the receiver processing unit (28, 34) will act appropriately on the package (120). This may involve decrypting it before continuing. The processing unit (28, 34) will then either execute the command, send interface data to the device interface (26, 36), send the network data to the application that requested it, or will send network data out through the network connection (30,32). The processing units (28, 34) are also responsible for the conversion of the packets into the appropriate form for their destination.

For example, a network packet might need to be repackaged as an Ethernet packet or mouse movements may need to be changed to graphic user interface or application programming interface (API) calls. The transport system (52, 54) may perform the conversion; this can offload some of the work from the processing unit (28, 34).

Figure 9A:
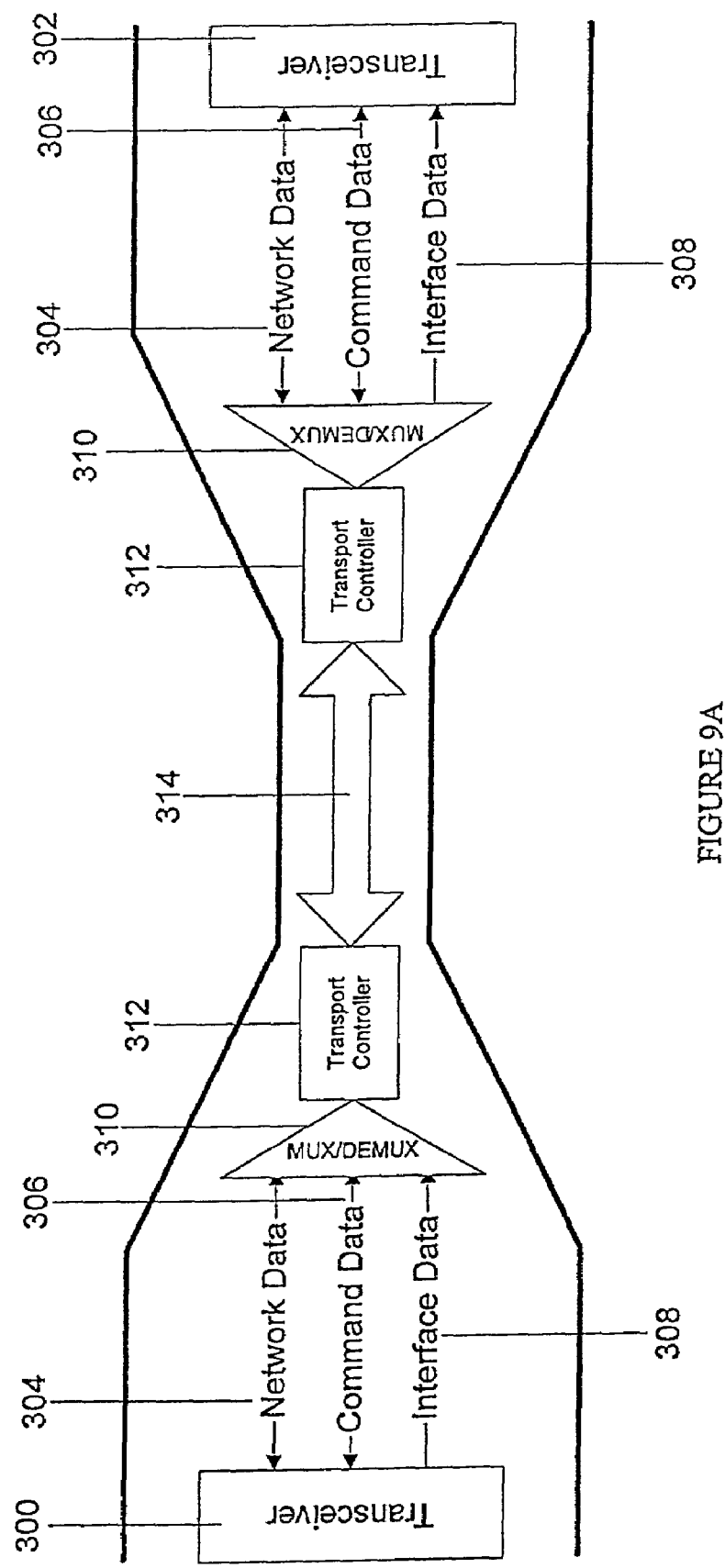
FIG. 9A shows the data flow of completely multiplexed data streams using only a single signal for transmission.
Figure 9B:
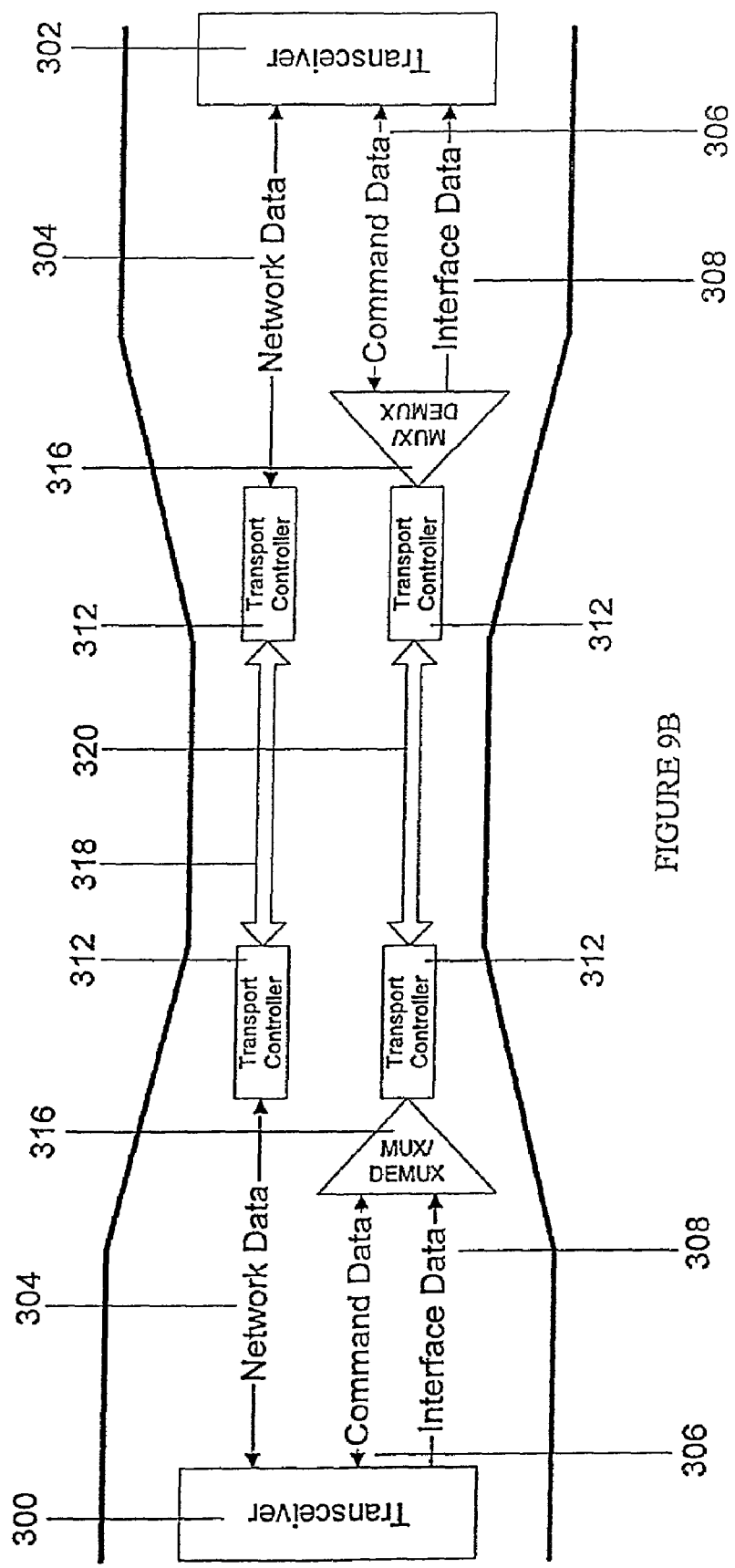
FIG. 9B shows the data flow of partially multiplexed (interface and command) data streams using two signals for transmission.
Figure 9C:
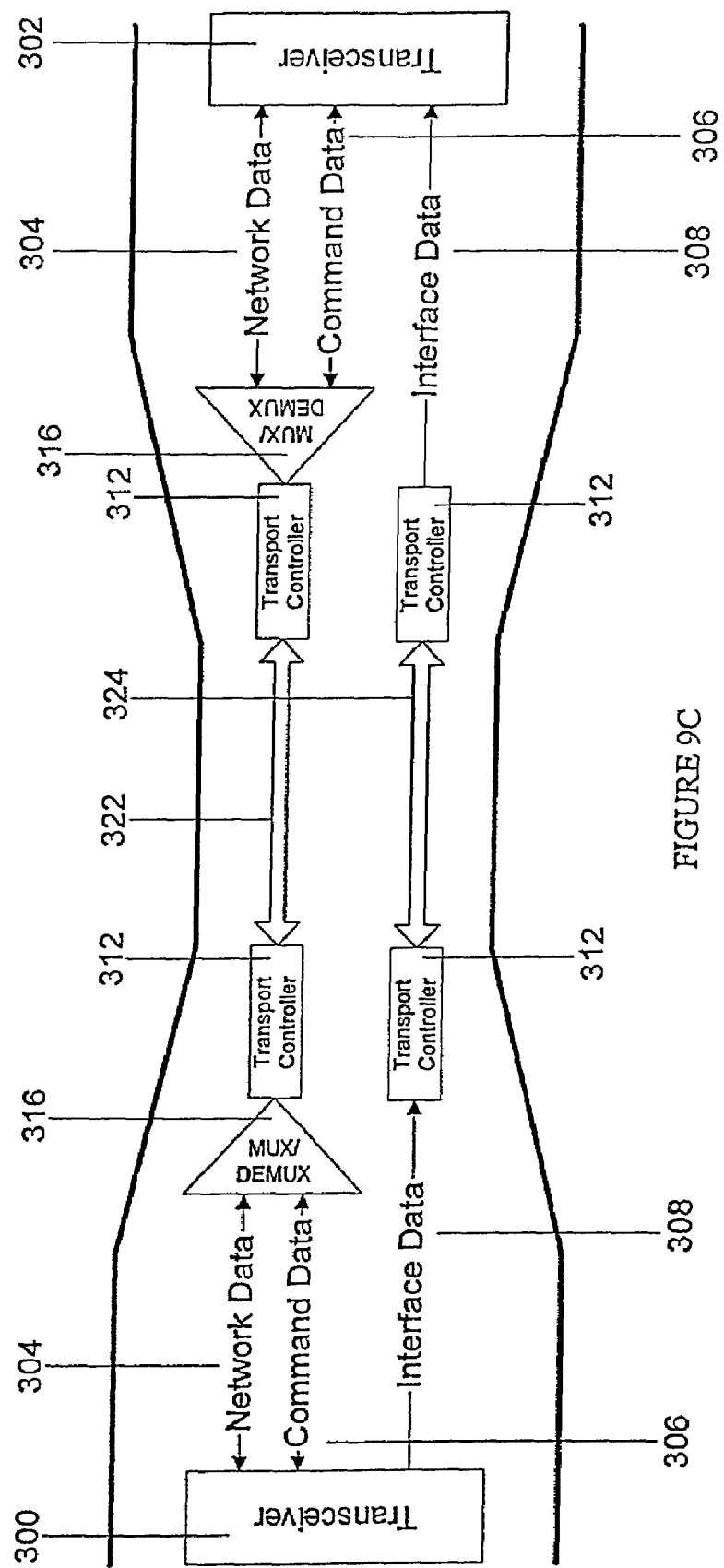
FIG. 9C shows the data flow of partially multiplexed (network and command) data streams using two signals for transmission.
Figure 9D:
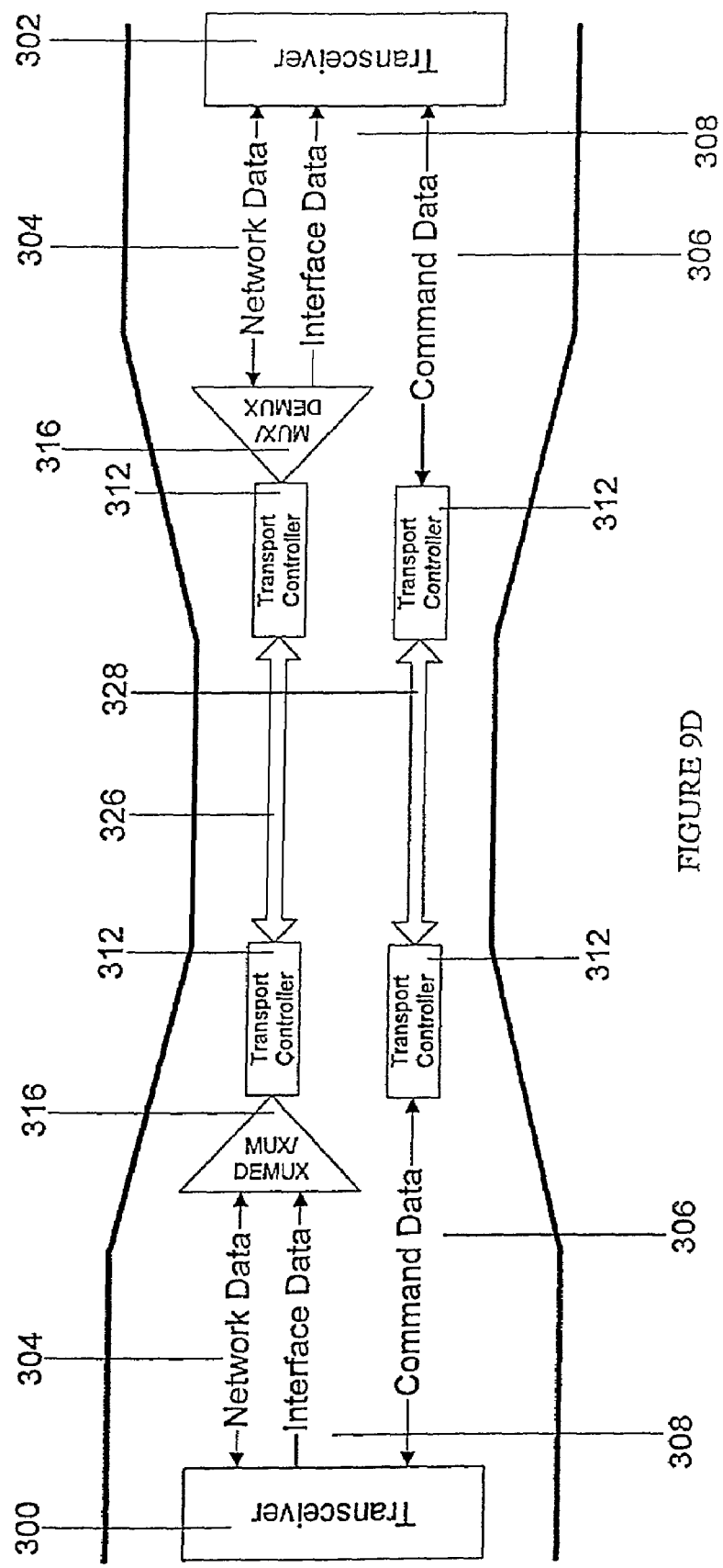
FIG. 9D shows the data flow of partially multiplexed (network and interface) data streams using two signals for transmission.
Figure 9E:
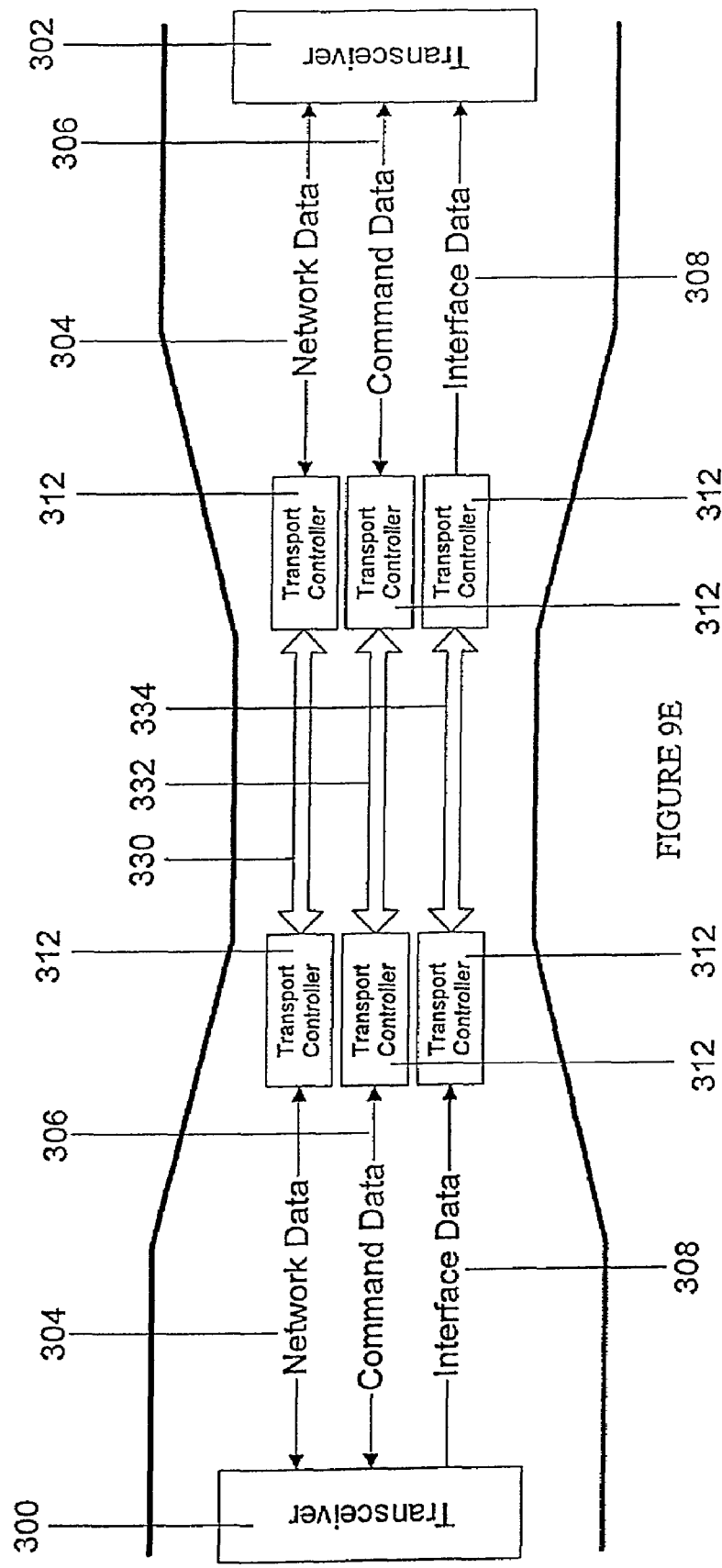
FIG. 9E shows the data flow of the three data streams using three signals for transmission.

The first data flow scenario shown in FIG. 9A involves sending information using a single signal (314) propagated through a medium to single or multiple devices which may or may not have an active connection. A medium can be free space, electrical wire, optical fibre, or any material that allows the communication of information using electrical, magnetic, electromagnetic, optical, mechanical, or other means of transmission and reception. The single signal (314) consists of three different data streams (304, 306, 308) that have been multiplexed (310) together. Before being propagated, the single signal is also sent through the transport controller (312) to be properly conditioned for transmission. The reverse of the aforementioned process is true for the reception and recovery of the transmitted signal (314).

The second (FIG. 9B) data flow scenario involves sending information using two signals (318, 320) propagated through a medium to single or multiple devices of which may or may not have an active connection. The two signals (318, 320) consist of three different data streams (304, 306, 308) of which the command data (306) and interface data (308) are multiplexed (316) together, the network data (304) stream remains unchanged. Before being propagated, the two signals (318, 320) are also sent through one or more transport controllers (312) to be properly conditioned for transmission. The reverse of the aforementioned process is true for the reception and recovery of the transmitted signals (318, 320).

The third (FIG. 9C) data flow scenario involves sending information using two signals (322, 324) propagated through a medium to single or multiple devices of which may or may not have an active connection. The two signals (322, 324) consist of three different data streams (304, 306, 308) of which the command data (306) and network data (304) are multiplexed (316) together, the interface data (308) stream remains unchanged. Before being propagated, the two signals (322, 324) are also sent through one or more transport controllers (312) to be properly conditioned for transmission. The reverse of the aforementioned process is true for the reception and recovery of the transmitted signals (322, 324).

The fourth (FIG. 9D) data flow scenario involves sending information using two signals (326, 328) propagated through a medium to single or multiple devices of which may or may not have an active connection. The two signals (326, 328) consist of three different data streams (304, 306, 308) of which the interface data (308) and network data (304) are multiplexed (316) together, the command data (306) stream remains unchanged. Before being propagated, the two signals (326, 328) are also sent through one or more transport controllers (312) to be properly conditioned for transmission. The reverse of the aforementioned process is true for the reception and recovery of the transmitted signals (326, 328).

The fifth data flow scenario (FIG. 9E) involves sending information using three signals (330, 332, 334) propagated through a medium to single or multiple devices of which may or may not have an active connection. The three signals consist of three different data streams (304, 306, 308) that have not been multiplexed together. Before being propagated, the three signals are also sent through one or more transport controllers (312) to be properly conditioned for transmission. The reverse of the aforementioned process is true for the reception and recovery of the transmitted signals (330, 332, 334).

In one embodiment, to connect a primary device to a secondary device, the following connection sequence should be followed. The user will indicate to the processing unit (28) through the user interface (26) that it wants to initiate a connection. The first thing that must be done is that the primary processing unit (28) must turn on and power up the transceiver (22) and transport system (52) if it has not already. The primary will then broadcast a request for identification command (44). This will be received by all secondaries in the area. The secondary (38) will then see whether or not it is currently in a session, and if so if it is allowed to accept another connection. If the secondary (38) is not allowed to start another session, or is not allowed to start a session with the requesting primary (24) for any reason, the request will be discarded and no information will be sent to the requesting primary (24); otherwise the secondary (38) will then send an identification command, which will contain a user intelligible description of the device. The primary (24) will then receive a listing of all the available devices and display the human intelligible descriptions to the user on the user interface (26). The user will then select which devices (secondaries) (38) to attempt connections with. After selection the primary (24) will initiate a connection command sequence with every device in which the user chose to connect with—it will do so starting at the first secondary (38) selected and proceed through the list.

One embodiment of the method might include the use of a database on the secondary (38) that would include primaries (24) that are trusted, and these primaries (24) would be connected automatically. Primaries (24) that are not listed in this trust database would have to transfer encryption keys and other information on a first connection. There may even be a separate process for adding primaries (24) to trust databases to minimize the risk of encryption keys being transmitted in an insecure medium.

One embodiment of the method might also provide for a quick connect method on the primary (24) that would allow for minimal user interaction for connection to single or multiple secondaries (38). For example, in an office where the same secondaries (38) are connected to every day, the primary (24) may contain a list of secondaries (38) in the category 'work' that would allow the user to connect to all the secondaries (38) in the list with minimal effort.

The connection command sequence starts with the primary (24) sending a request for connection command to the desired secondary (38). The secondary (38) then receives this command and then sends back an acknowledgement. The primary (24) then receives this acknowledgement, and sends a command packet (44) containing the desired network setup to the secondary (38). The secondary (38) then receives this command and checks to see if this network setup is compatible with its own settings. If it is, then it sends back an acknowledgement; otherwise, it sends back a command indicating its desired network settings. The primary (24) will then receive this command and if it is an acknowledgement then the primary (24) will continue, otherwise it will display a message to the user through the feedback device (26) indicating that network settings were in conflict and that this session will continue offline (without an external network connection). Some other settings such as encryption keys, timeout periods, and functionality may also be transferred depending on the resources that are being accessed; however, after the network parameters have been worked out, the session is ready for use. If either the primary

(24) or secondary (38) at anytime receive a non-acknowledgement command (or event) then the connection will be abandoned. If during the connection command sequence there is no response from the other device for a certain timeout period, the connection will be abandoned.

If the primary (24) is connected to more than one secondary (38) the user must choose any and all of the secondaries (38) that are to receive the interface data. The user may in fact only want to send data to only one, or may want to send data to several. The primary (24) will have to select which of the devices is allowed to use its network connection (30), as only one secondary (38) will be given access to it at one time. However, the user will be able to change the secondary that is allowed to use the network connection (30) on the fly without having to reconnect.

To communicate with multiple devices, several different methods may be employed. Six alternative scenarios for interconnection between devices are described herein, but may not be limiting of methods available to those skilled in the art.

Figure 3:
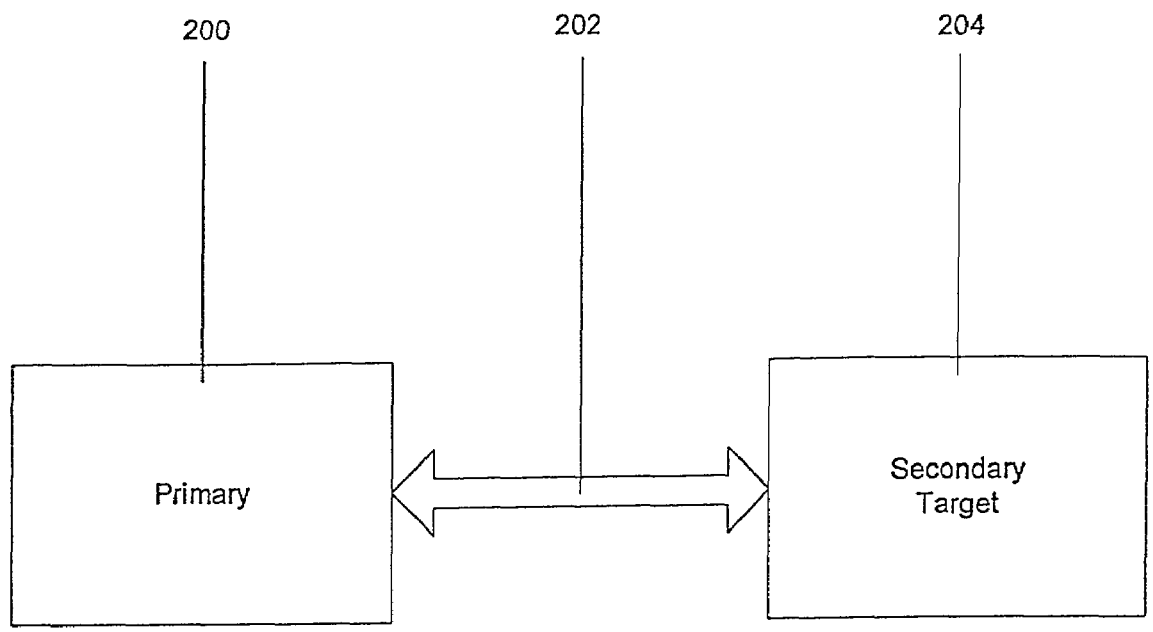
FIG. 3 shows the simplest relationship between two devices that use the invention.

As shown in FIG. 3, the first scenario involves two devices, a single primary (200) and a single secondary (204). The primary (200) and secondary (204) have a common communications interface (202), and use this interface (202) to communicate with each other. This interface (202) includes all of the hardware, the transmission medium, and protocol translation necessary to implement the actual communication portion of the method.

Figure 4:
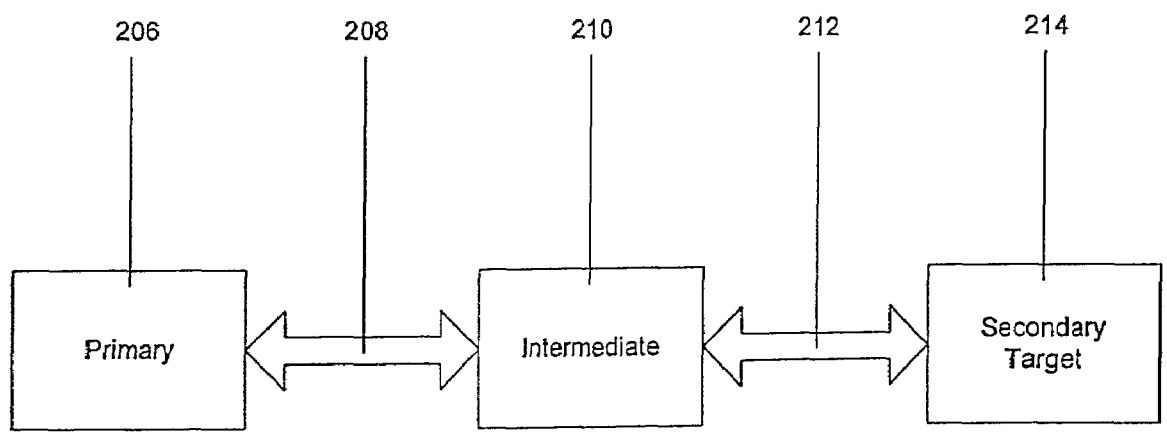
FIG. 4 shows the relationship between two devices separated by an intermediate device.

As shown in FIG. 4, the second scenario, in its simplest form, involves three devices, a single primary device (206), a single intermediate device (210), and a single secondary target device (214). An intermediate device (210) acts as the combination of a primary device (24) and a secondary device (38), and will contain the minimum hardware and/or software required to implement a primary (24) and/or secondary device (38). The two communication interfaces (208, 212) need not be common, as the intermediate device (210) can contain multiple communication interfaces. Thus, the interface (208) between the primary (206) and the intermediate (210) need not be the same as that of the interface (212) between the intermediate (210) and the secondary (214).

In a typical configuration, the primary (206) can communicate with either the intermediate device (210) or the secondary target device (214). In this way, the intermediate device (210) can either interpret data directly sent to it, or it can translate packets between the primary device (206) and secondary target device (214) if necessary. The intermediate device (210) can also provide a list of secondary devices to the primary (206) that may otherwise not be available, and thus provides the capability for the primary (206) to establish a connection to said secondary devices. The secondary target device (214) is visible to the primary device (206) through the intermediate device (210), but the primary device (206) need not know the actual communication interface (212) between the intermediate device (210) and the secondary target device (214).

In addition, appending another primary device to the beginning, and/or inserting one or more intermediate device(s) between the primary and secondary, and/or appending a secondary to the end, will form a chain. In this manner, a total of N devices can be connected together, with the primary device being able to communicate with N-1 secondary devices through N-1 communication interfaces, of which each communication interface can be different. As a side effect of the chaining, devices that would otherwise be out of range or unavailable become accessible to the primary.

Figure 5:
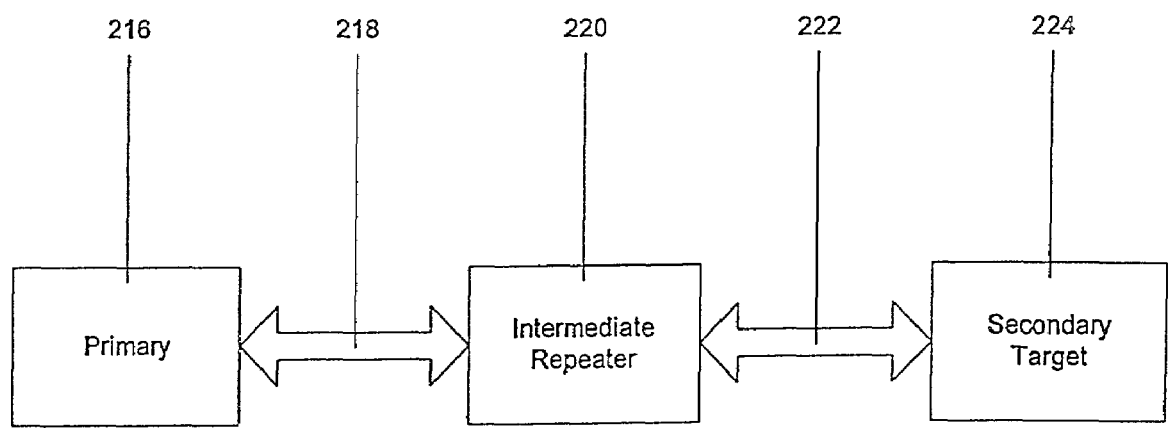
FIG. 5 shows the relationship between two devices separated by a repeater device.

As shown in FIG. 5, the third scenario in its simplest form involves three devices, a single primary device (216), a single intermediate repeater (220), and a single secondary target device (224). An intermediate repeater device (220) acts as a translation/regeneration device, and will contain the minimum hardware and/or software required to perform any translation and regeneration of data as required. The two communication interfaces (218, 222) need not be common, as the intermediate repeater device (220) can contain multiple communication interfaces. Thus, the interface (218) between the primary (216) and the intermediate repeater (220) need not be the same as that of the interface (222) between the intermediate repeater (220) and the secondary (224).

In a typical configuration, the primary (216) can only communicate with the secondary target device (224). The intermediate repeater device (220) may translate between communications interfaces (218, 222), or in the case of similar interfaces (218, 222), regenerate the signal between the primary (216) and secondary device (224). The intermediate repeater device (220) can also provide a list of secondary devices to the primary (216) that may otherwise not be available, and thus provides the capability for the primary (216) to establish a connection to said secondary devices. The secondary target device (224) is visible to the primary device (216) through the intermediate repeater device (220), but it need not know the actual communication interface (222) between the intermediate repeater device (220) and the secondary target device (224). The intermediate repeater (220) can also appear invisible to either device, as it can compile a list of all devices and the interfaces required to communicate with each, and then use this list to interpret and repackage packets for transmission in the appropriate communications interface (218, 222).

To achieve larger distances between devices and/or translation between many different communication interfaces, additional intermediate repeaters can be added to the middle of the chain (216). In this manner, a total of N repeater devices can be connected together, with the primary device (216) being able to communicate with the secondary target device (224) through N+1 communication interfaces, each interface which can be different from the other.

Figure 6:
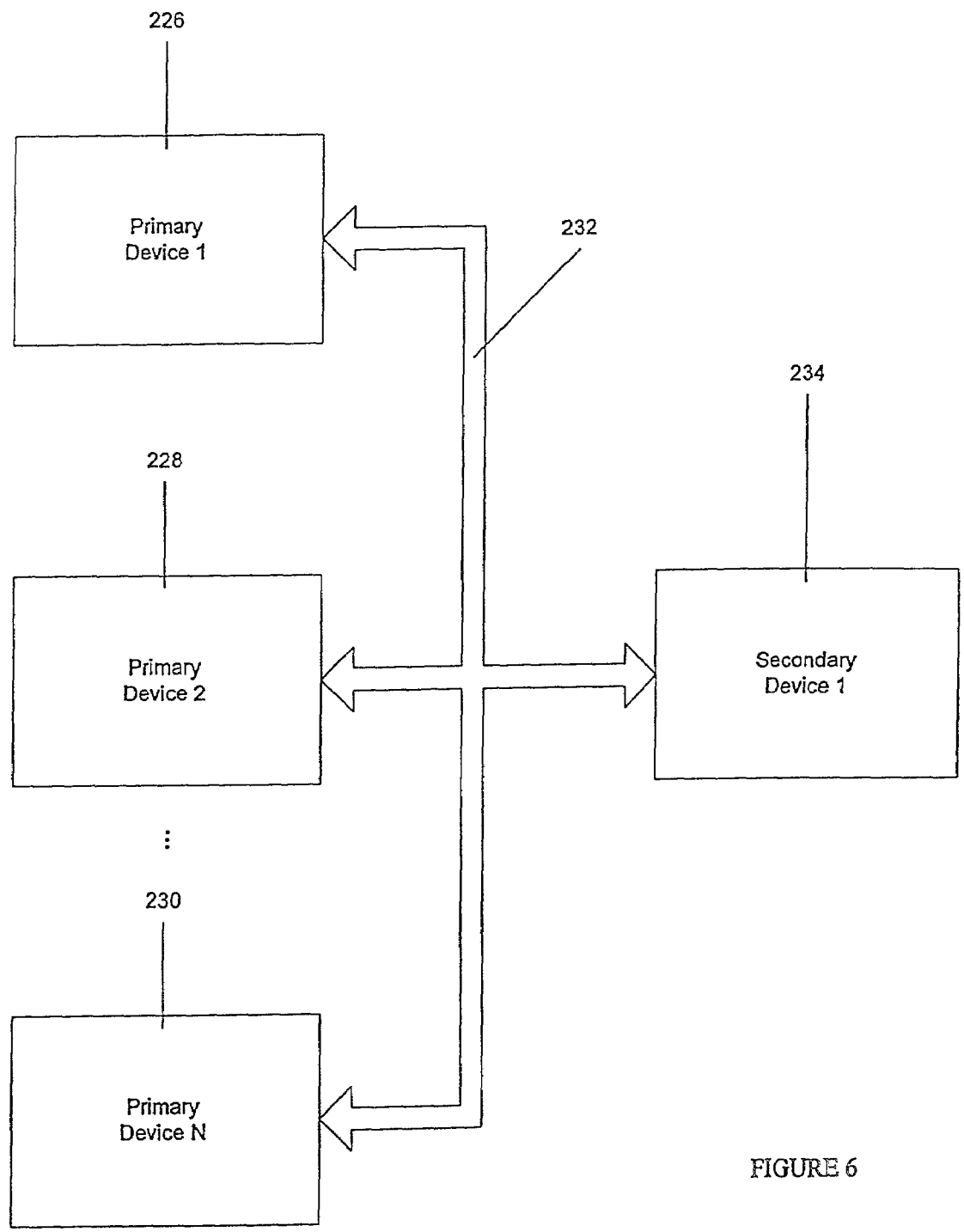
FIG. 6 shows how a single secondary device can have multiple primary devices and the relationship between them.

As shown in FIG. 6, the fourth scenario involves multiple primary devices (226, 228, 230) communicating with a single secondary device (234) using one common communications interface (232), many private communications interfaces (232), or a combination of the two. In this configuration, the first primary device that established a connection to the secondary (234) is assigned the directorship of the session when another primary device connects to the secondary (234). Prior to the connection of a second primary to the secondary (234) (i.e. a single primary (24, 200) connected to a single secondary (38, 204)) the session is governed by the rules indicated in scenario one. As director, the primary can assign control of the secondary (234) to another primary device as necessary. As an additional stipulation, the primary devices (226, 228, 230) do not need an establishment of trust between them; however, they must have established a trust relationship between themselves and the secondary device (234). Since it is possible that a primary might gain unsolicited directorship of the session, a system of precedence must then be established at the secondary device (234).

If the secondary (234) is to use an auxiliary network connection through a primary, the first director of the session is the default network provider. The director can then transfer the responsibility of network provider to another primary without relinquishing his directorship. The director is the only primary that is allowed to send interface commands to the secondary device (234). If a director transfers control of the interface, the directorship is also transferred to the primary that was given control. Essentially, the director controls the interface. When the directorship changes, the provider of the network connection does not change. If the primary providing the network connection is disconnected, or if the network connection is lost, the director will have the responsibility of re-establishing the network connection either through reassigning the responsibility or requesting a reconnection through the current provider.

In preferred embodiments, the secondary device is intended to have the capability to handle multiple primary devices simultaneously, and in doing so, must contain precedence levels for different trusted primary devices. Primaries that are not trusted are assigned the lowest precedence level if they are allowed to connect at all. The capability of assigning precedence levels defines how directorship is distributed, and allows primaries with higher precedence levels to seize directorship of the secondary. When a relationship between the primary and secondary is established, the precedence level on the secondary can also be set. Interaction between the primary devices (226, 228, 230) and the secondary device (234) will proceed as indicated below.

The first primary device (226) initially establishes a connection to the secondary (234). When a second primary device (228) establishes a connection to the secondary device (234), the secondary device (234) assigns directorship to the first primary device (226) unless the second primary device (228) indicates it wants to assume directorship upon connection and has an equal or higher precedence level than the first primary device (226). After two or more primaries are connected, directorship can be seized by any primary with a higher precedence level than the current director.

If the precedence level of a non-director primary is equal to or less than the precedence level of the director, the primary device can send a request to the secondary device (234) that the primary device wishes to obtain the directorship of the session. The current director can then be informed of this by a simple message from the secondary (234). In effect, the secondary device (234) controls the whole process by passing a token (directorship) to one of the primary devices (226, 228, 230) that wishes to control it.

If the director is disconnected or wishes to relinquish his directorship, the directorship is given to the primary device with the highest precedence level that has been connected for the longest duration and is not the current director. If a primary device different from the director wishes to control the session from that point onward, it can send a request to the secondary device (234) that it wishes to control the session, at which point the secondary device (234) notifies the director of the session that another primary desires directorship. At any time, the director can relinquish control of the session.

Figure 7:
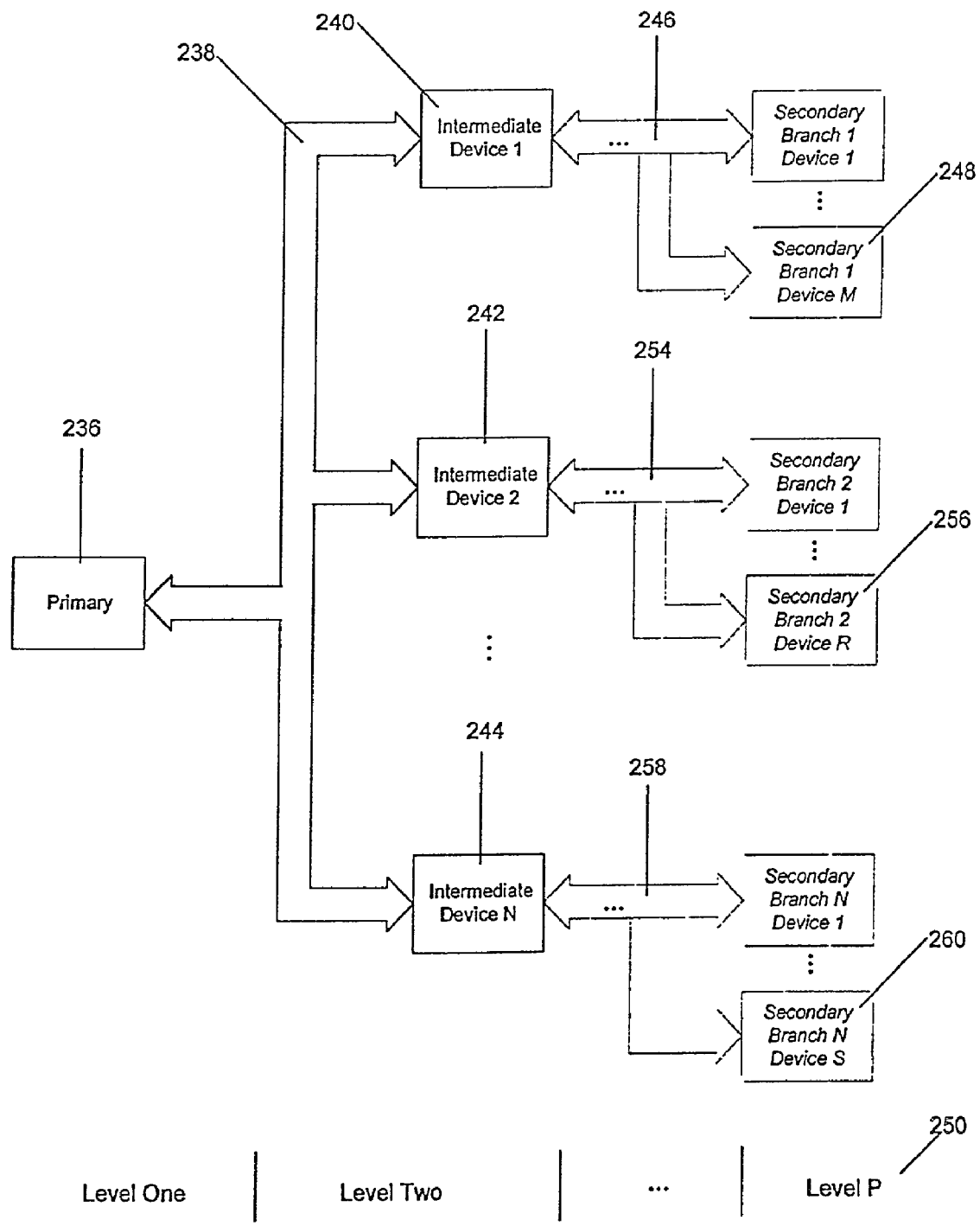
FIG. 7 shows the branching of a single primary device to multiple secondary devices.

As shown in FIG. 7, the fifth scenario involves using a single primary device (236) to broadcast to multiple secondary devices (240, 242, 244), or to communicate with multiple secondary devices (240, 242, 244) independently, in a single session, using one or several communications interfaces (238). For broadcast communication, all devices must use a common communication interface (238); this is to ensure all devices will receive the broadcasted message. However, for non-broadcast sessions, different communication interfaces (238) between the primary and each secondary can be utilized.

When establishing a session to any secondary device (240, 242, 244), the primary device (236) must initially proceed as it would for any private relationship between devices. The difference appears when the primary device (236) establishes a connection with more than one secondary device (240, 242, 244). When connected to two or more secondary devices (240, 242, 244), the primary device (236) has the option of sending interface information to any combination of the secondary devices (240, 242, 244), and can utilize any available network connection(s) from any of the secondary devices (240, 242, 244). If the network connection is no longer available, the primary (236) can automatically switch between secondary devices (240, 242, 244) to maintain a network session. Secondary devices (240, 242, 244) can automatically default to using the network connection of the primary device (236), if available.

The primary device (236) may also have additional capabilities. It can broadcast network data (42) in addition to interface information (46). In this way, many secondary devices (240, 242, 244) could become dummy terminals to the primary device (236) with the primary device (236) controlling all aspects of the session, with the exception of the interpretation of the information.

Single primary (206) and secondary devices (214) can have intermediate devices (210) between them, and this concept can be extended to multiple secondary devices (240, 242, 244) connected to a single primary (236). The primary (236) will have single or multiple secondaries (240, 242, 244) connected through a single or multiple of connection interfaces (238). Each secondary (240, 242, 244) in turn can be connected to a single or multiple of secondaries (248, 256, 260) through a single or multiple of connection interfaces (246, 254, 258). This branching can continue to form P (250) hierarchical levels. Each intermediate device (240, 242, 244) under the primary (236), and before the final secondary (248, 256, 260) in each branch will be capable of routing packets to the appropriate secondary (248, 256, 260). These intermediate devices (240, 242, 244) will also be able to convert the communication interface (238) between the hierarchical level immediately above it to the communication interface (246, 254, 258) immediately below it.

Figure 8:
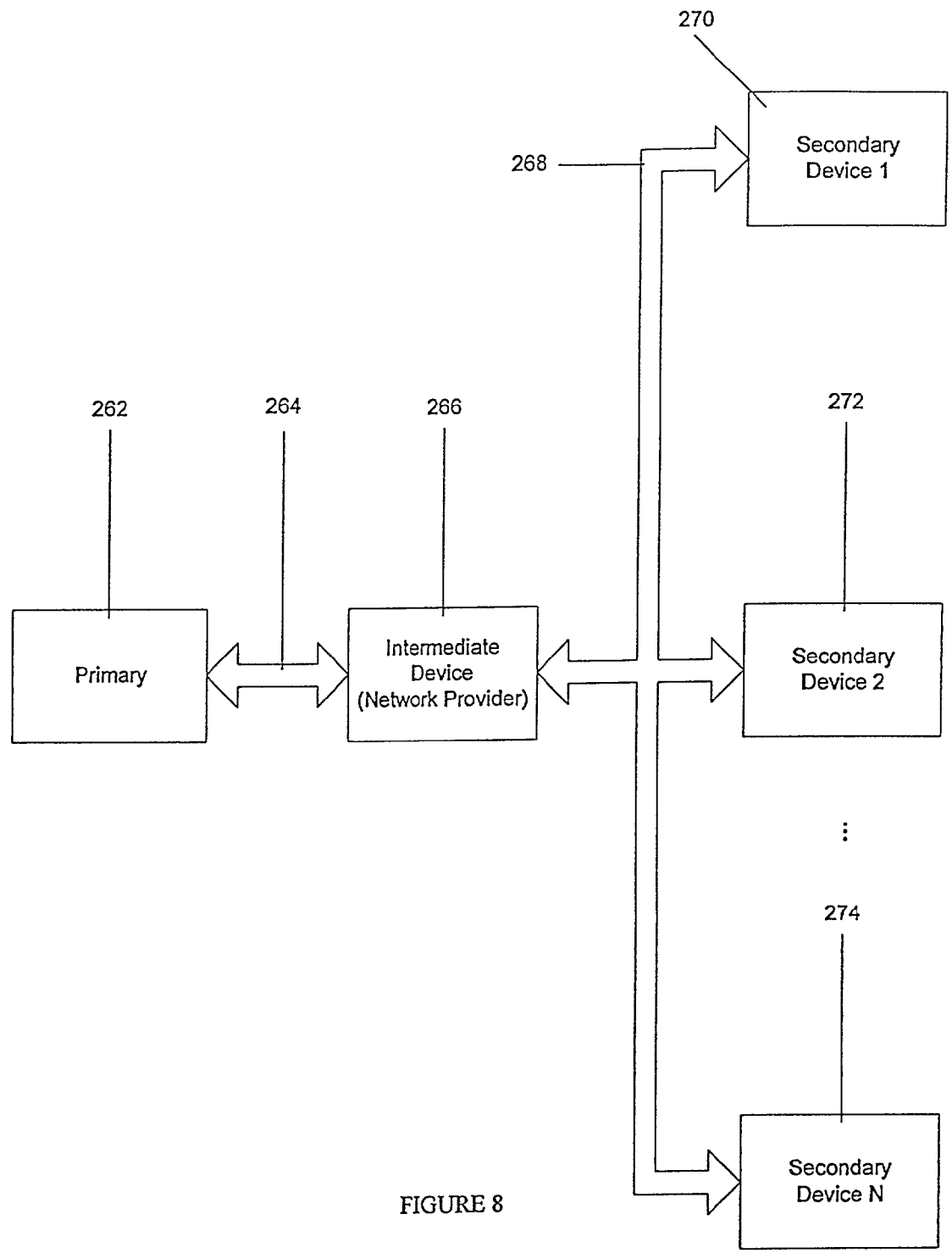
FIG. 8 shows how an intermediate device can distribute network access to both primary and secondary devices connected to it.

As shown in FIG. 8, the sixth scenario involves a connection structure between three or more devices, with only one device (266) having a desirable network connection. In this case, the intermediate device (266) serves the same purpose as it would if it were a proxy server in a typical local area network. Each secondary device (270, 272, 274) can make requests to use the network connection of the intermediate device (266). The primary device (262) can make use of the intermediate device's (266) network connection as well, but does not need to ask permission; rather, it only has to inform the intermediate device (266) that it is using it as a network provider.

In a typical application, the intermediate device (266) could be a network router, and the primary device could be a device used by the network administrator. Using the primary device (262), the network administrator could configure the router and access its network resources to bring up a web page, or check his/her email. The router is connected to many secondary machines (270, 272, 274) on the secondary network using Ethernet or another communications interface (268) for a local area network; because of this situation, the network administrator could access each of the secondary machines (270, 272, 274) to check their status, given that he/she could access each secondary machine by himself/herself independent of the router and given that the communications interface (268) was a non-issue.

All the above scenarios can be combined in various forms to obtain the final relationship between one or more primary devices and one or more secondary devices. When a plurality of primary and secondary devices are connected, a combination of one or more of these scenarios may be implemented.

If the user has the method running as the active application on the primary (24) then the primary (24) will send all interface data to the secondary (38) though an interface data stream (46). For button data the interface data stream (46) will send a key press, key down, or key up event, as well as the status of the modifier keys (control, alternate, shift, capital lock, etc.) and the key pressed. For pointer data the interface data (46) will contain the direction of the movement, and will send one interface command (46) for the start, and another command (46) for the stop of that movement. If a button is pressed on the pointer it will send a button down event, and a button up event when released; also, the status of the modifier keys will be sent. The secondary (38) has the responsibility of making these interface data commands (24) work with the interface provided—this will often be done by calls to the application programmers interface on the secondary (38) by the software that runs the method. There are other schemes and formats that may be used to transfer interface data between the primary and secondary—the aforementioned is just one possible way to do so.

A preferred method of transferring command and/or interface data between the primary and secondary devices is disclosed in Applicant's co-pending U.S. Provisional Patent Application No. 60/352,228 entitled "A Method and Device to Provide Pointer Control and Movement Using Minimal Data" and filed Jan. 29, 2002, the contents of which are incorporated herein by reference.

If the secondary (38) requires the network facilities of the primary (24) then the following sequence of events will occur. The secondary (38) will send a command to the primary (24) indicating that it should be prepared to start a network connection (30). The primary then powers on any circuitry required to provide the network connection (30) (this may be a modem, Ethernet connection, etc). The primary (24), after all the preparations for the network connection (30) have been made, will then send a command to the secondary (38) indicating that it can start sending network data (42). The secondary (38) will now establish a connection with the network provider through the primary's (24) network connection (30). In the case of a cellular phone connection, these may be several modem commands followed by PPP (Point-to-Point Protocol) packets, all of which are considered network data (42). The secondary (38) will then use the network connection (30) like it was it's own, sending network data (42) back and forth. After completion of the network session, the secondary (38) will send a command to the primary (24) to close the connection and power down the network connection circuitry (30). If network data (42) is sent without a prior network initiation command, that data may either be discarded or may trigger initiation of a connection depending on the settings of the primary (24). There are other schemes and formats that may be used to transfer network data and initiate a connection between the primary and secondary—the aforementioned is just one possible way to do so.

The secondary (38) will contain settings regarding the network capabilities it possesses and which devices are allowed to connect to it. During the connection sequence, the secondary (38) will determine whether or not the primary (24) will be allowed to use its own connection (32) or the primary (24) may indicate that its connection (30) is to be used solely. After the session has been started and an application indicates that it needs content from an external network, the secondary (38) will look at its settings and initiate the network session accordingly. This complete control of the network connection (30, 32) allows for the ability to protect internal network resources and also allows the user to access private network services available only though it's own connection (30).

If a system implements the method with network data (42) multiplexed with other streams, the network data segment (42) size should be kept small to ensure that interface data (46) can be interlaced with the network data (42) to give as much of a real-time feel as possible. If large network data segments (42) are used, then there may not be sufficient bandwidth available to accurately send the interface (46) and command data (44). The device will then become difficult to use as the pointer will not move smoothly, keystrokes may take several seconds to show up on the interface, voice and sound may have intermittent breaks.

To disconnect a session, the device (24, 38) that is severing the connection sends a disconnect command to the other device (38, 24). The receiving device will then respond with an acknowledgement packet (44) to indicate that the disconnect command has been received. A disconnect sequence may also be initiated if there is no communication between the two devices for some timeout period that may be setup during the initial connection routine. After the disconnect sequence has been completed, both devices (24, 38) should be in the same state that they were in prior to the session being started. Both devices (24, 38) may have a quick disconnect that will allow for disconnecting all connected devices at once.

FLOWCHARTS

Figure 10:
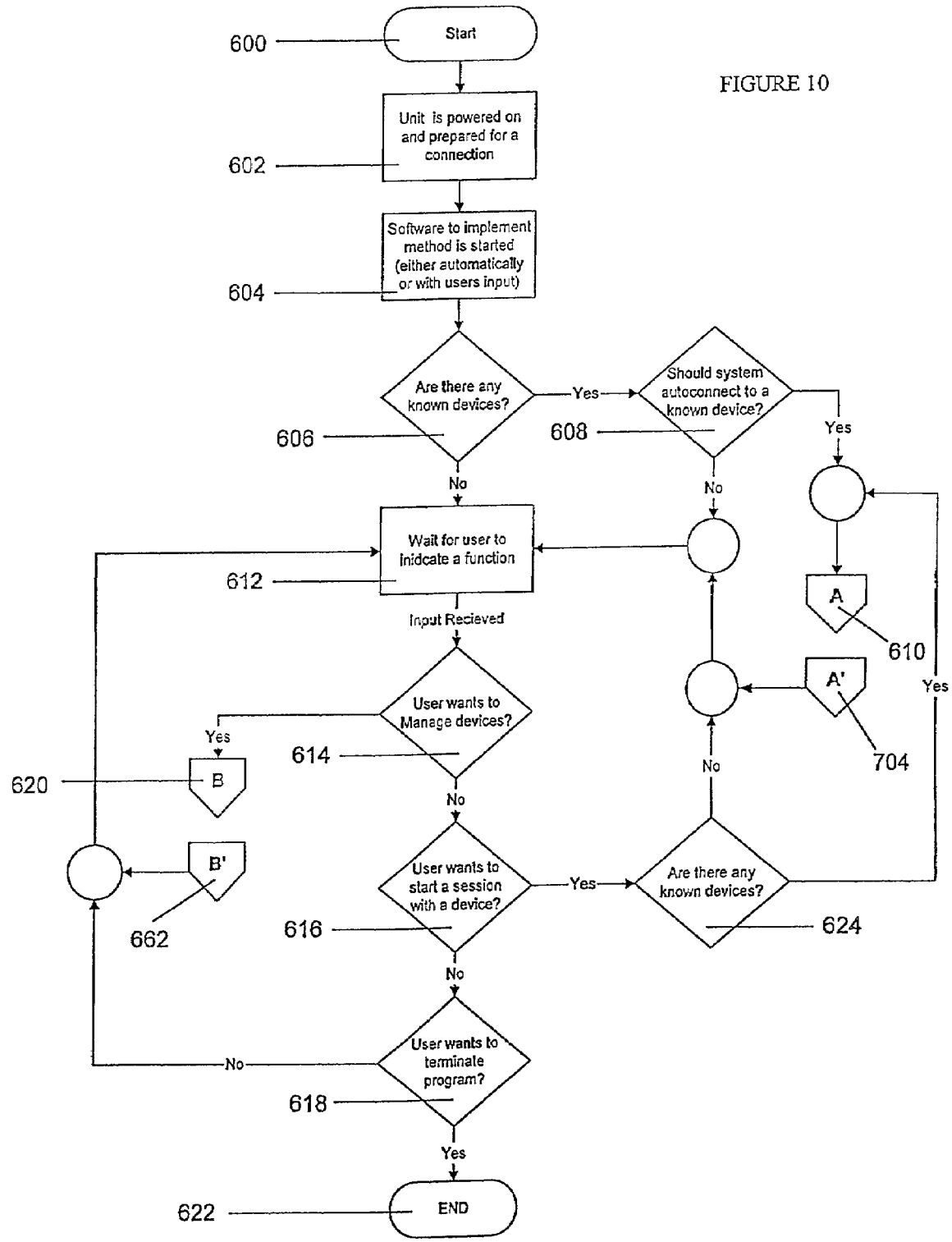
FIG. 10 is a flowchart illustrating initiation and termination of a session.

FIGS. 10, 11, 12, 13 and 14 illustrate flowcharts of one embodiment of a preferred method. FIG. 10 illustrates the method and how it works for a single primary connecting to a single secondary. Upon deciding to power on the primary (600), a user powers the device on (602) and during this stage any firmware or drivers required by the method will be loaded. The system will then either start the software to implement the method automatically or the user will start the software themselves (604). After the software has been loaded, the first thing that the device will check is whether there are any known devices (606), which may be done by searching a configuration database on the primary. If there are no known devices, the system will wait for the user to indicate a function (612). If there are known devices, the method will then determine if a session with one of these known secondary devices should be started automatically (608). If not, then the system will wait for the user to indicate a function (612);otherwise, it will attempt to establish a connection to that secondary device (610).

While waiting for the user to indicate a function (612), the system will continue in a wait state. When the user indicates a function, the system will determine which function it is to perform. It will first check to see if it is to search for new devices (614). If so, then it will initiate the search routine (620); otherwise, it will ask the user if they would like to start a session with a secondary (616). If so, then the method will then check to ensure that a device was selected (624) and initiate the session with the selected device(610); otherwise, the system will return to the wait state (612). If the user did not want to establish a session with a secondary, then the system will check if the user wanted to terminate the method (618). If the user did not indicate that they wanted to terminate the method, the method will return to the wait state (612); otherwise, it will terminate itself (622).

Figure 11:
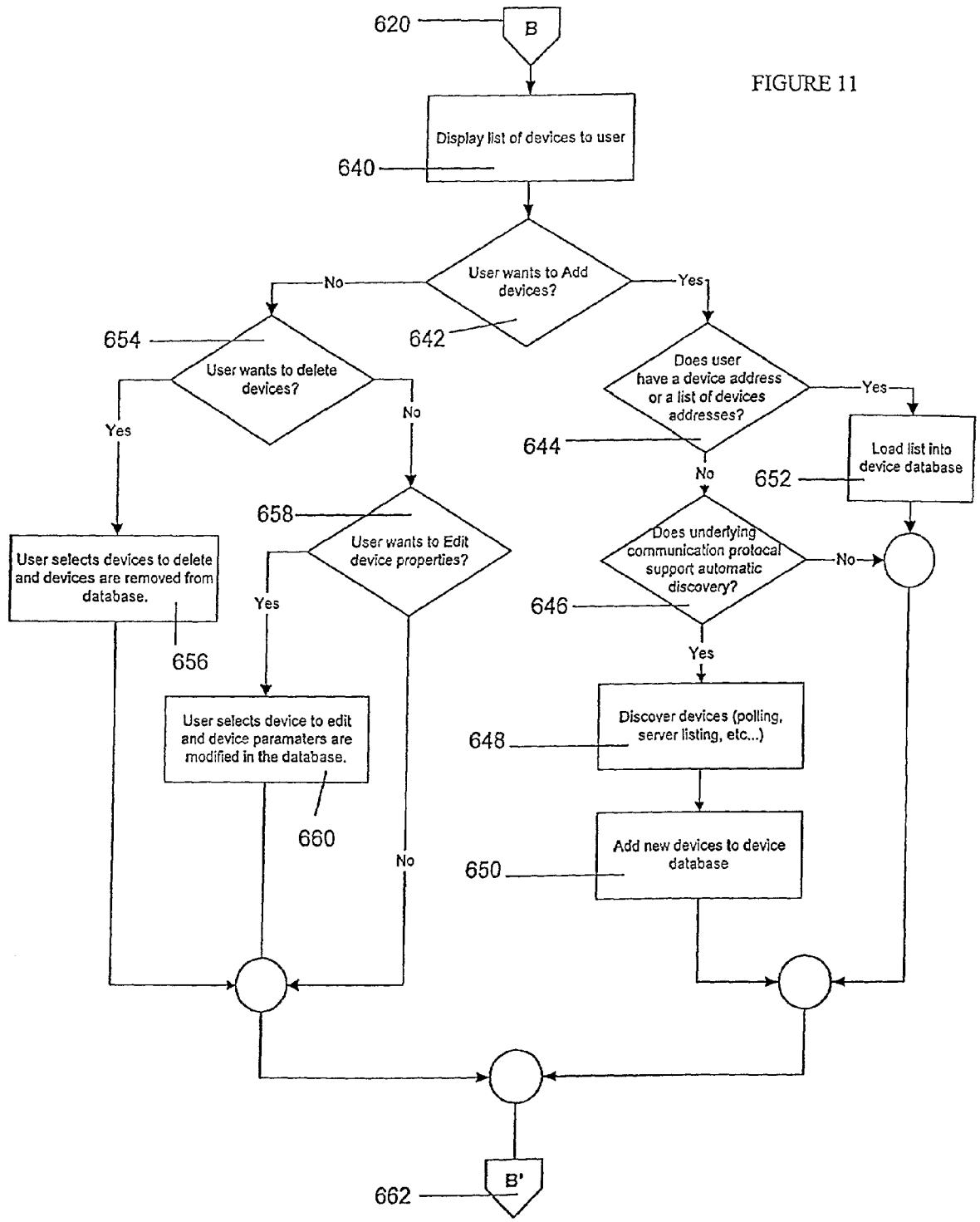
FIG. 11 is a flowchart illustrating secondary and primary device management.

If the user wants to manage the accessible devices list (620), then the method will check what the user wants to do with the devices as is shown in FIG. 11. First, the primary displays a list of devices supporting the method from which the user may pick (640). If they want to add devices (642), the method will check if the user wants to manually add devices (644). This could be from a file or manually specified by the user; in either case, these devices will be added to the device database (652). If the user wants to automatically find any devices, then they may want to use automatic discovery if that feature is available (646); otherwise, the method cannot add any devices to the database and will exit the manage devices function (662) and return to the wait state (612). If the automatic discovery process finds devices (648), these devices will be added to the database (650), at which point the method returns (662) to the wait loop (612).

If the user chose to remove devices from the device database (654), the user will select which devices they wish to remove. Those devices will then be removed from the database (656). After this, the method returns (662) to the wait loop (612). If the user chose to modify the parameters for a device in the database (658), the user will select the devices they wish to modify. The metadata for these devices will then be modified by the user in the database (662). The method then returns (662) to the wait loop (612).

Figure 12:
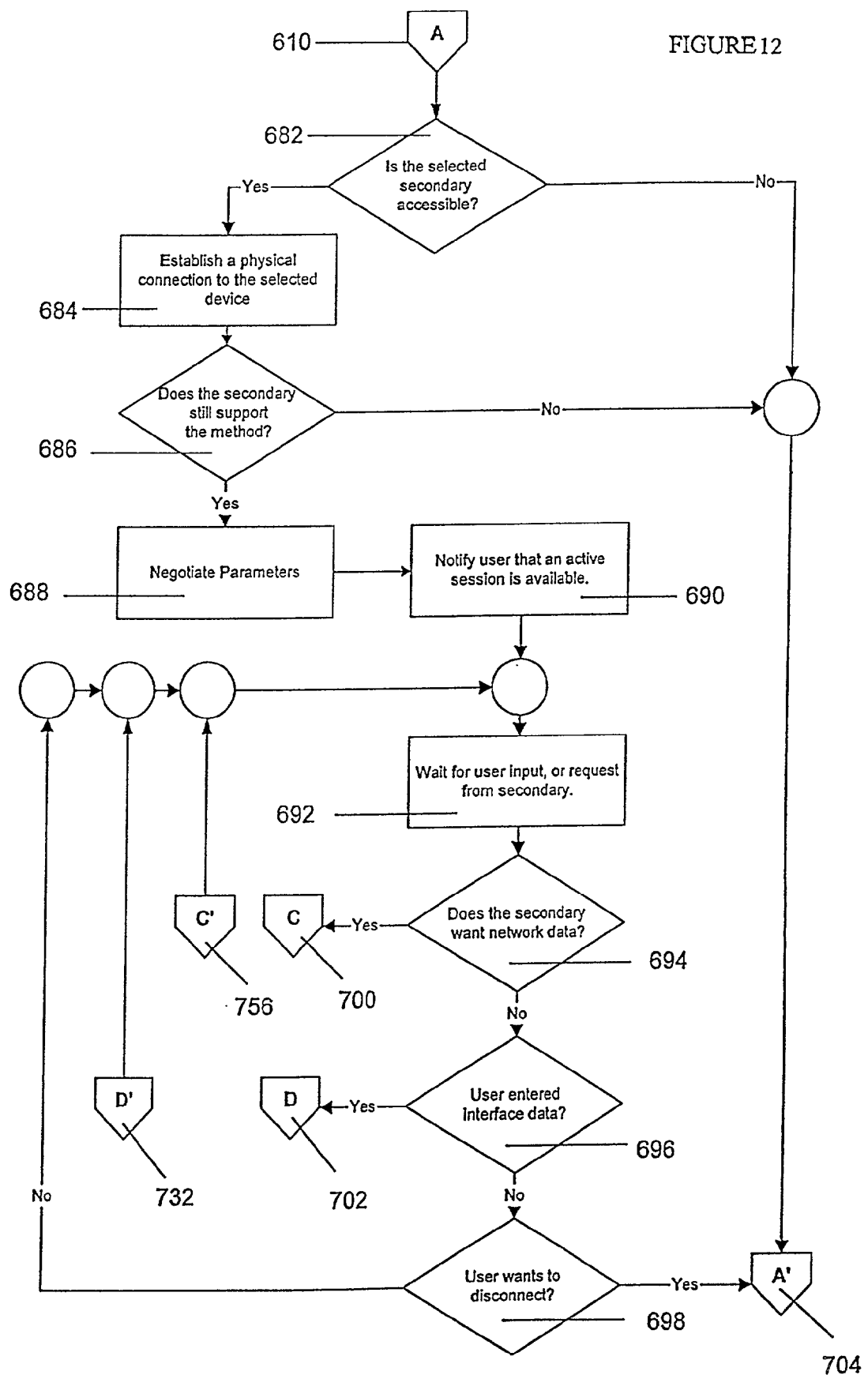
FIG. 12 is a flowchart illustrating communication between the primary and secondary devices.

To start a session using the method (680) as shown in FIG. 12, the primary must first determine whether or not the desired secondary is available (682). This may be done through a discovery protocol or by just attempting a connection to the device. If the secondary is available, a physical link will be established (684) (this includes wireless connections such as Bluetooth, 802.11b, etc.). Then the method on the primary will query the secondary device to determine if it still supports the method (686) and will then negotiate parameters (688) (i.e. establishing network parameters, trust relationships, etc.). After negotiating parameters, the method on the primary will provide the user with notification (690) that an active session is available with the desired secondary. When the user wishes to disconnect the session (698), the method on the primary will send a disconnect command to the secondary. This command will also terminate the physical link. If the physical link fails at any time, then both the secondary and the primary automatically disconnect. After disconnecting, the method returns (704) to the wait loop (612).

Figure 13:
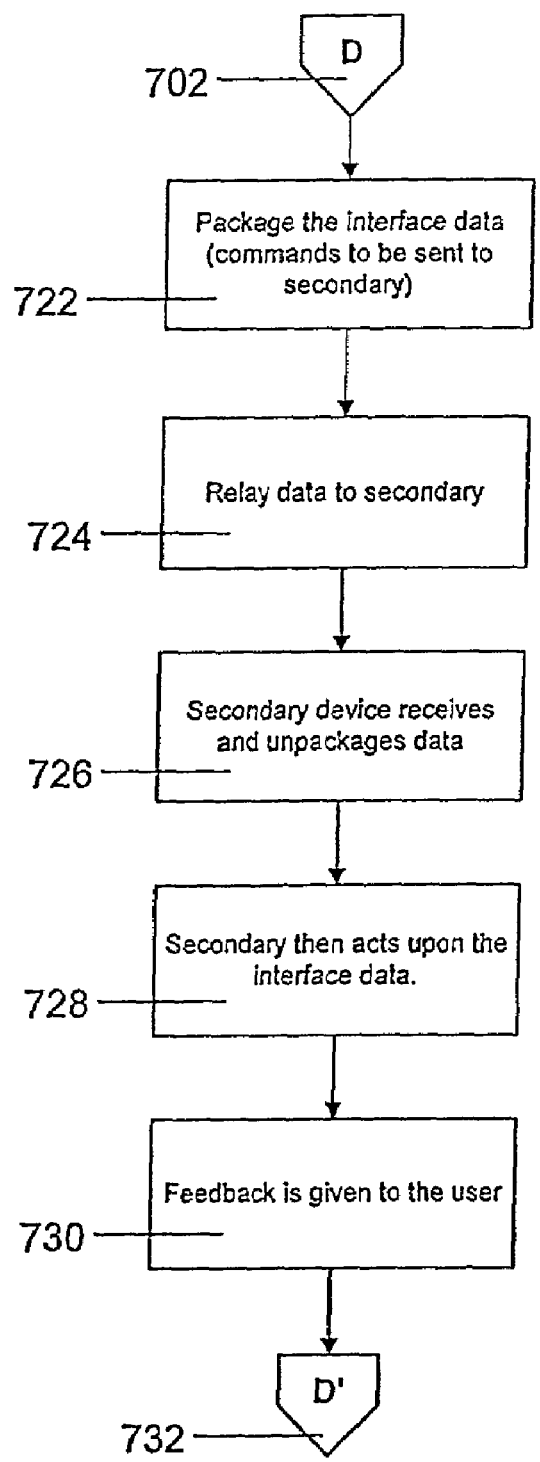
FIG. 13 is a flowchart illustrating flow of interface data to the secondary device.

After the session is established, then the system will wait (692) either for the user to input data into the primary or for network data or data requests from the secondary. If the user inputs interface data (696), then the system will handle that data by going to the interface data processor (702). In the interface data processor (702), as seen in FIG. 13, the interface commands will be packaged such that they fit the method (722). The primary device will then relay this packaged interface data to the secondary (724). The secondary device receives this packaged interface data and unpacks the data to receive the associated interface data (726). This interface data will then be acted upon by the secondary device (728) according to its own instruction set and feedback will be given to the user by the secondary (730). The system will then return to the input loop (732) to await further inputs (692). This process may be repeated many times until the session is disconnected.

Figure 14:
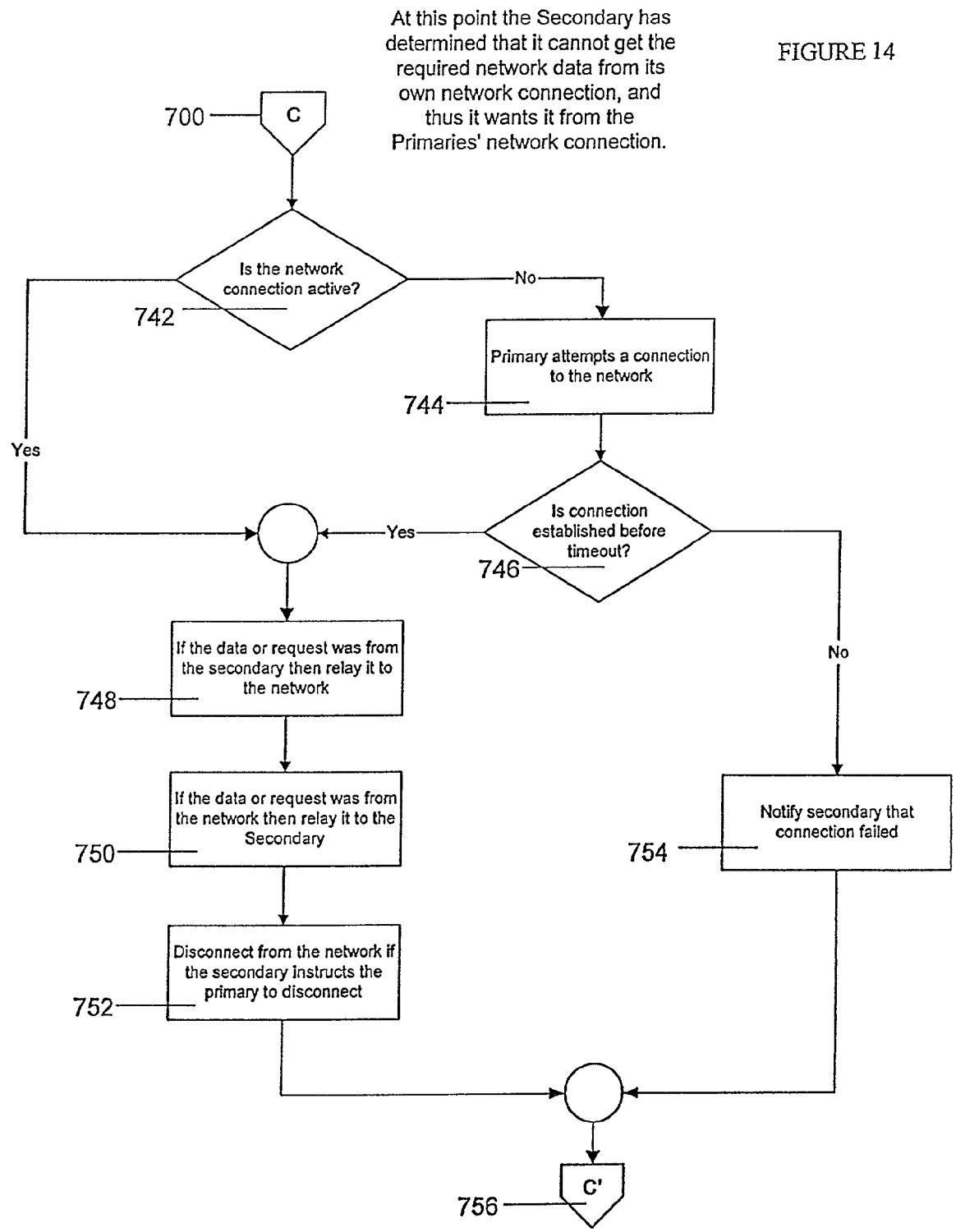
FIG. 14 is a flowchart illustrating management of network connections and flow of network data.

The user, through the interface data passed by the primary, may trigger a request for network data by the secondary device (728). The secondary device independently determines whether that network data must come through the primary device or whether such data can be accessed directly through a network already available to the secondary. If it must come through the primary, then the secondary will send a request for network data to the primary (692, 694; FIG. 12). The primary will then check to see if it already has an established connection to a network. (742; FIG. 14) If not, it will attempt to establish a connection (744). If the connection is not established before the timeout period (746), then the secondary device will be notified that a connection is not available (754). If the network connection were available, or is now available, and the network data or request came from the secondary, the system will relay that data or request to the network (748). If the network connection were available, or is now available, and the network data or request came from the network to the secondary, then the system will relay that data to the secondary (750). The secondary may also instruct the primary to disconnect the network connection if it no longer needs the network connection (752). (This may be due to user interface data being sent to the secondary (696) while the network was processing a previous data request whereby such input signalled the secondary to terminate the session.)

When the current network data or request has been processed, the system will return to the input loop (756). This input/response process may repeat many times until the session is disconnected.

EXAMPLES

Assuming that display devices, such as monitors, are capable as described, the invention may be implemented to control monitors situated in restaurants, airports, factories, and even people's cars to achieve the same result. It will not matter if the primary device that they are using is a cellular phone, PDA, handheld computer, wireless watch, or other wireless-capable device so long as it uses the method and configuration as described.

Embedded systems would no longer be constrained by the limits of their own displays. Such devices could use the miniature projector described previously, or a wireless tablet computer, to display more diagnostic information than is easily accomplished via their own visual interfaces. A factory worker could then immediately order repair parts wirelessly over the Internet via the embedded system even in the most remote areas of the factory.

Rather than "pushing" content to pedestrians wandering by their stores, as many proponents of Bluetooth technology currently advocate, shops equipped with monitors using this invention could invite people to view their menus, product catalogues, product ingredients, etc. all from the sidewalk in front of the store. This gives the user control over the content they interact with, rather than having such content indiscriminately broadcast to them as they walk by.

People could order their movie tickets from the back of the line by projecting the theatre Web site on any convenient surface using the aforementioned micro-projector. Or, they could conduct business on the bus or train using their briefcase top, or a sheet of paper, as a screen for displaying the content provided by their cellular phone to the micro-projector.

Even if the invention is not directly embedded into such devices, it is also envisioned that monitors and televisions could be manufactured with built-in ports to accommodate microdrives (miniaturized disk drives) or flash memory devices that support wireless networking using one of the wireless protocols, such as Bluetooth or 802.11b, and this invention could furnish the wireless network to such display devices. The user then needs only to carry their cellular phone and the microdrive. They could then use any monitor or TV not connected to a computer, but having the appropriate docking port for the microdrive, to attach the microdrive and establish the wireless network connection via the cellularphone to provide Internet content to the monitor or TV.

For existing monitors and TVs, i.e. legacy devices, a similar microdrive/wireless device could be connected between the display device and any existing broadband services (cable or Ethernet) in a manner similar to that used for gaming consoles and set top boxes used with televisions. Use of the primary wireless device to provide Internet content to the display device via the wireless microdrive unit would take precedence over the signals received over the broadband service—if the primary is not serving merely as a controller. The primary control device would then interact with the content it concurrently provides to the microdrive/display connection. Turning off the primary control device, or terminating the wireless service as described by this invention, would automatically restore the signal provided by the existing broadband service.

Beyond the display of Internet data, the method can be used to enable a cellular phone to pick up, or place, a telephone call from a land-line phone, i.e. one using a conventional wired phone line, by wirelessly connecting to the wired phone using Bluetooth™. The user could select the wired phone as the device to be controlled and issue a command to answer the wired phone from the cellular phone. The audio (voice) signals could be passed by the wireless network with the user using the microphone and speaker of the cellular phone to speak into and to listen to the call coming into the wired phone line. In this manner, the user would not have to incur 'air time' on the cellular network when speaking over the land line via Bluetooth.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A method of network computing using a primary device and a secondary device, wherein said primary device includes a central processing unit, a memory, a user input device, wireless network connection means and wireless secondary device connection means, and wherein the secondary device includes an operating system, a graphical user interface that comprises display means and wireless primary device connection means, the method comprising the steps of:
   (a) establishing a wireless two-way communication connection between the primary device and the secondary device;
   (b) establishing a wireless network connection between the primary device and a computer network;
   (c) generating command data for synchronizing the secondary device with the primary device and controlling the secondary device from the primary device and transmitting command data to the secondary device;
   (d) receiving user input commands at the primary device and transmitting user input commands as interface data from the primary device to the secondary device;
   (e) receiving data and data requests generated by the secondary device at the primary device and transmitting the data and data requests to the computer network from the primary device;
   (f) receiving computer network data and data requests from the computer network at the primary device and transmitting the computer network data and data requests to the secondary device from the primary device; and
   (g) wirelessly controlling the secondary device with the primary device to display the computer network data using the display means of the secondary device.

2. The method of claim 1 wherein the computer network is the Internet and computer network data comprises Internet content.

3. The method of claim 2 wherein the secondary device further comprises a browser and the display means comprises a display screen.

4. The method of claim 3 wherein the interface data comprise pointer movement control and click commands, and key inputs.

5. The method of claim 1 wherein at least two of interface data, command data and network data are interleaved or multiplexed within the primary device before transmission to the secondary device.

6. The method of claim 5 wherein all three of interface data, command data and network data are interleaved or multiplexed within the primary device before transmission to the secondary device.

7. The method of claim 1 wherein all three of interface data, command data and network data are sent as three distinct signals.

8. The method of claim 1 wherein the primary device may connect to a plurality of secondary devices, either simultaneously or sequentially.

9. The method of claim 1 wherein a plurality of primary computers devices may connect to one or more secondary devices, either simultaneously or sequentially.

10. The method of claim 1 wherein at least one intermediate device is disposed between the primary computer device and the secondary device and wherein the intermediate device may separately communicate with the primary computer device and the secondary device.

11. The method of claim 10 wherein at least two intermediate devices are provided and each intermediate device communicates with a primary, secondary or another intermediate device that is adjacent in the chain.

12. The method of claim 1 wherein the secondary device is connected to its own computer data network and the secondary device may fulfill its own data requests in response to interface data received from the primary device.

13. The method of claim 1 wherein the data transmitted between the primary device and the secondary device is encrypted.

14. A handheld computing device including a central processing unit and a memory comprising:
   (a) wireless computer network connection means;
   (b) means for wirelessly connecting with a secondary device which includes an operating system and a graphical user interface comprising display means;
   (c) means for accepting user input commands and generating interface data;

(d) means for receiving data and data requests from the secondary device and transmitting them to the computer network;
(e) means for receiving computer network data and data requests from the computer network;
(f) means for generating command data for synchronizing the secondary device with the handheld device, for controlling the secondary device from the handheld device and for commanding the secondary device to display computer network data using said display means; and
(g) means for transmitting command data, interface data and computer network data and data requests to the secondary device whereby said handheld device is capable of wirelessly controlling the secondary device to display the computer network data using said display means.

15. The device of claim 14 wherein wirless network connection means comprises a cellular or satellite modem.

16. The device of claim 14 wherein the secondary device connection means comprises a radio frequency transport system.

17. The device of claim 16 wherein the transport system utilizes the Bluetooth protocol.

18. The device of claim 16 wherein the transport system utilizes the IEEE 802.11 protocol.

19. The device of claim 14 wherein the computer network is the Internet.

20. The device of claim 19 wherein the secondary device further includes a browser and the means for accepting user input commands accepts interface data generated from pointer movement control and click commands, and key input.

21. The device of claim 16 wherein the transport system comprises separate transport controllers for each of network data, command data and interface data.

22. The device of claim 20 further comprising a multiplexer/demultiplexer for multiplexing two or more of network data, command data and/or interface data.

23. A method for controlling a secondary device from a primary device in network computing, said method being embodied on a computer-readable medium such that, when implemented on the primary device including wireless computer network connection means and means for wirelessly connecting with the secondary device which includes an operating system (and/or virtual machine, and/or interpreter), a graphical user interface and wireless primary device connection means, said method permits control of the secondary device by the primary device, the computer-readable medium comprising:
(a) a code segment which generates command data for synchronizing the secondary device with the primary device and controlling the secondary device from the primary device.
(b) a code segment which processes user input commands to the primary device and generates interface data;
(c) a code segment which receives data and data requests from the secondary device and transmits them to the computer network;
(d) a code segment which receives and processes network data and data requests from the computer network, and
(e) a code segment which causes transmission of command data, interface data and network data and data requests to the secondary device whereby the primary device is capable of wirelessly controlling the secondary device to display the computer network data on the graphical user interface.

24. The method of claim 23 wherein the computer-readable medium further comprises a code segment which multiplexes two or more of the command data, interface data, and network data for transmission to the secondary device.

25. A computing device including a central processing unit and a memory comprising:
(a) wireless computer network connection means;
(b) means for wirelessly connecting with a secondary device which includes an operating system and a graphical user interface;
(c) logic which generates command data for synchronizing the secondary device with the computing device and controlling the secondary device from the computing device;
(d) logic which processes command data;
(e) logic which processes user input commands and generates interface data;
(f) logic which receives network data and data requests from the secondary device and transmits them to the computer network;
(g) logic which receives data and data requests from the computer network; and
(h) logic which causes transmission of command data, interface data and network data and data requests to a secondary device whereby the computing device is capable of wirelessly controlling the secondary device to display the computer network data on the graphical user interface.

26. The device of claim 25 further comprising logic which multiplexes two or more of the command data, interface data, and network data for transmission to the secondary device.

* * * * *